(12) United States Patent
Guzy, Sr. et al.

(10) Patent No.: US 11,412,046 B2
(45) Date of Patent: Aug. 9, 2022

(54) MOBILE IOT EDGE DEVICE USING 3D-DIE STACKING RE-CONFIGURABLE PROCESSOR MODULE WITH 5G PROCESSOR-INDEPENDENT MODEM

(71) Applicant: Arbor Company, LLLP, Glenbrook, NV (US)

(72) Inventors: Darrel James Guzy, Sr., Menlo Park, CA (US); Wei-Ti Liu, Saratoga, CA (US); Darrel James Guzy, Jr., Glenbrook, NV (US)

(73) Assignee: Arbor Company, LLLP, Glenbrook, NV (US)

( * ) Notice: Subject to any disclaimer, the term of this patent is extended or adjusted under 35 U.S.C. 154(b) by 0 days.

(21) Appl. No.: 17/348,224

(22) Filed: Jun. 15, 2021

(65) Prior Publication Data
US 2021/0409494 A1  Dec. 30, 2021

Related U.S. Application Data

(60) Provisional application No. 63/045,804, filed on Jun. 29, 2020.

(51) Int. Cl.
*H04L 29/08* (2006.01)
*H04L 67/12* (2022.01)
(Continued)

(52) U.S. Cl.
CPC .............. *H04L 67/12* (2013.01); *H04B 1/40* (2013.01); *G16Y 30/00* (2020.01); *H04W 88/06* (2013.01)

(58) Field of Classification Search
CPC ................................ G02B 6/421; H01L 24/29
See application file for complete search history.

(56) References Cited

U.S. PATENT DOCUMENTS 5,737,766 A   4/1998 Tan
5,844,844 A   12/1998 Bauer et al.
(Continued)

FOREIGN PATENT DOCUMENTS

JP   H09-232433    9/1997
JP   2000-284945   10/2000
JP   2007-502014    2/2007

OTHER PUBLICATIONS

International Patent Application No. PCT/US2020/029163, International Search Report and Written Opinion dated Jul. 17, 2020, 10 pages.
(Continued)

*Primary Examiner* — Zhiren Qin
(74) *Attorney, Agent, or Firm* — Sheppard, Mullin, Richter & Hampton LLP

(57) ABSTRACT

A mobile Internet-of-Things (IoT) edge device, comprising a reconfigurable processor unit including a substrate; a die stack coupled to the substrate and having a field-programmable gate array (FPGA) die element and a reconfigurable die element capable of serving as storage memory or as configuration memory based on configuration information; and a processor coupled to the substrate and configured to cooperate with the die stack for processing data; and a processor-independent connectivity unit coupled to the reconfigurable processor unit and including an antenna; a radio-frequency chip (RFIC) coupled to the antenna and configured to receive incoming signals and transmit outgoing signals over the antenna; circuitry configured to translate the incoming signals to incoming data or transmit the outgoing data to outgoing signals; and a system interface configured to transmit the incoming data to the reconfigurable processor unit for processing, and configured to receive the outgoing data from the reconfigurable processor unit.

16 Claims, 19 Drawing Sheets

(51) Int. Cl.
*H04B 1/40* (2015.01)
*H04W 88/06* (2009.01)
*G16Y 30/00* (2020.01)

(56) References Cited

U.S. PATENT DOCUMENTS

| | | | |
|---|---|---|---|
| 5,959,881 | A | 9/1999 | Trimberger et al. |
| 6,091,262 | A | 7/2000 | New |
| 6,263,400 | B1 | 7/2001 | Rangasayee et al. |
| 6,441,641 | B1 | 8/2002 | Pang et al. |
| 6,717,436 | B2 | 4/2004 | Kress et al. |
| 6,894,527 | B1 | 5/2005 | Donlin et al. |
| 6,931,543 | B1 | 8/2005 | Pang et al. |
| 7,084,487 | B1 * | 8/2006 | Conn ............... H01L 24/73 257/E21.511 |
| 7,117,373 | B1 | 10/2006 | Trimberger et al. |
| 7,126,214 | B2 | 10/2006 | Huppenthal et al. |
| 7,429,926 | B1 | 9/2008 | Drimer |
| 7,864,620 | B1 | 1/2011 | Pedersen |
| 9,779,016 | B1 | 10/2017 | Shen et al. |
| 10,802,735 | B1 | 10/2020 | Guzy et al. |
| 11,043,480 | B1 * | 6/2021 | Jain ............... H01L 25/0657 |
| 11,232,360 | B1 | 1/2022 | Nama et al. |
| 2001/0015919 | A1 | 8/2001 | Kean |
| 2004/0000928 | A1 | 1/2004 | Cheng et al. |
| 2004/0177237 | A1 * | 9/2004 | Huppenthal ............ H01L 25/18 712/226 |
| 2005/0059377 | A1 | 3/2005 | Schucker et al. |
| 2005/0237083 | A1 | 10/2005 | Bakker et al. |
| 2005/0242836 | A1 | 11/2005 | Goetting et al. |
| 2006/0001137 | A1 | 1/2006 | Hundt et al. |
| 2006/0059345 | A1 | 3/2006 | Fayad et al. |
| 2007/0094534 | A1 | 4/2007 | Andreev et al. |
| 2007/0288765 | A1 | 12/2007 | Kean |
| 2008/0272803 | A1 | 11/2008 | Balasubramanian et al. |
| 2008/0313397 | A1 * | 12/2008 | Millman ............ G06F 11/1076 711/E12.005 |
| 2010/0205470 | A1 | 8/2010 | Moshayedi et al. |
| 2012/0153566 | A1 * | 6/2012 | Ito ............... B65H 7/02 271/265.01 |
| 2013/0067467 | A1 | 3/2013 | Aslot et al. |
| 2015/0262633 | A1 | 9/2015 | Lee |
| 2016/0036998 | A1 | 2/2016 | Goda |
| 2016/0057305 | A1 | 2/2016 | Suzuki |
| 2016/0098561 | A1 * | 4/2016 | Keller ............... G06F 21/566 726/24 |
| 2016/0154602 | A1 | 6/2016 | Obayashi |
| 2016/0248588 | A1 | 8/2016 | Langhammer |
| 2016/0253260 | A1 | 9/2016 | Koyama |
| 2016/0321113 | A1 | 11/2016 | Pinto et al. |
| 2016/0380635 | A1 * | 12/2016 | Roberts ............ G06F 15/7892 326/38 |
| 2017/0123674 | A1 | 5/2017 | Mori et al. |
| 2017/0148504 | A1 * | 5/2017 | Saifuddin ............ G06F 1/3225 |
| 2017/0179096 | A1 | 6/2017 | Dang et al. |
| 2018/0047663 | A1 | 2/2018 | Camarota |
| 2018/0261566 | A1 | 9/2018 | Babcock et al. |
| 2018/0335805 | A1 * | 11/2018 | Charlesworth ....... G06F 1/1626 |
| 2019/0259695 | A1 | 8/2019 | Gandhi et al. |
| 2019/0279963 | A1 | 9/2019 | Woo et al. |
| 2019/0319364 | A1 | 10/2019 | Yang et al. |
| 2019/0349848 | A1 | 11/2019 | Bali |
| 2020/0065263 | A1 | 2/2020 | Liff et al. |
| 2020/0105774 | A1 | 4/2020 | Penumatcha et al. |
| 2020/0117261 | A1 | 4/2020 | Piwonka et al. |
| 2020/0174783 | A1 | 6/2020 | Yamada et al. |
| 2021/0028539 | A1 * | 1/2021 | We ............... H01Q 1/243 |
| 2021/0200839 | A1 | 7/2021 | Cech et al. |
| 2021/0204027 | A1 * | 7/2021 | Fan ............... H04N 21/6193 |
| 2021/0257492 | A1 * | 8/2021 | Lilak ............... H01L 29/1045 |
| 2021/0406178 | A1 | 12/2021 | Enrici et al. |

OTHER PUBLICATIONS

International Patent Application No. PCT/US2020/029010, International Search Report and Written Opinion dated Jul. 21, 2020, 7 pages.

International Patent Application No. PCT/US2021/037502, International Search Report and Written Opinion dated Aug. 31, 2021, 8 pages.

Lyke, James C., et al., "An Introduction to Reconfigurable Systems", Proceedings of the IEEE, vol. 103, No. 3, Mar. 2015, retrieved on [Aug. 15, 2021], retrieved from the internet <URL: https://ieeexplore.ieee.org/stamp/stamp.jsp?tp=&arnumber=7086420>, 27 pages.

* cited by examiner

Status Register Set-Up

|  | $R_0$ | $R_1$ | $R_2$ | $R_3$ | $R_4$ | $R_5$ | $R_6$ | $R_7$ |
|---|---|---|---|---|---|---|---|---|
| Ex 1 | 1 | 1 | 1 | X | X | X | X | X |

↑ $Vref_{RL}$   ↑ $Vref_T$   ↑ $Vref_{RH}$

X = Don't care

Note:
All reference values are good as reference inputs
to S/A. Set → Vref T

Case $A_1$

|  | $R_{RL}$ | $R_T$ | $R_{RH}$ |  |  |  |  |  |
|---|---|---|---|---|---|---|---|---|
| Ex. 2 | 0 | 1 | 1 |  |  |  |  |  |

Case $A_2$

Set → $Vref_{TH}$   Vref T   or   Vref H

[ $\overline{Scan}$ → Done ]

~ 1100

| | $R_0$ | $R_1$ | $R_2$ | $R_3$ | $R_4$ | $R_5$ | $R_6$ | $R_7$ |
|---|---|---|---|---|---|---|---|---|
| Ex. 3 | 1 | 1 | 0 | | | | | |
| | Vref LR | Vref T | Vref HR | | | | | |

Set ⟶ Vref LR,  Case A:

| | $R_0$ | $R_1$ | $R_2$ | $R_3$ | $R_4$ | $R_5$ | $R_6$ | $R_7$ |
|---|---|---|---|---|---|---|---|---|
| Ex. 4 | 1 | 0 | 0 | | | | | |
| | Vref LR | Vref T | Vref HR | | | | | |

Not recommended case ⟶ Weak bit

Note:
Detecting two passing Vref states to use one Vref as input of S/A

| Reference Input |

FIG. 11

MOBILE IOT EDGE DEVICE USING 3D-DIE STACKING RE-CONFIGURABLE PROCESSOR MODULE WITH 5G PROCESSOR-INDEPENDENT MODEM

PRIORITY CLAIM

The present application claims the benefit of U.S. Provisional Patent Application Ser. No. 63/045,804, filed Jun. 29, 2020 and entitled "Mobile IoTs Edge Device Designs: Use of 3D-Die Stacking Re-Configurable Processor Module with 5G Processor-Independent Modem," which is incorporated by reference herein. The present application also incorporates by reference U.S. Pat. Nos. 10,802,735, 10,782,759 and 7,126,214.

TECHNICAL FIELD

This disclosure pertains to Internet of Things (IoT) devices.

BACKGROUND

The Internet of Things (IoT) generally refers to a system of devices capable of communicating over a network. An IoT device can include an everyday object such as a toaster, coffee machine, thermostat, washer, dryer, lamp, automobile, and/or the like. An IoT device can also include sensors in buildings and factory machines, sensors and actuators in remote industrial systems, and/or the like. An IoT device can be used in many different applications and provide many different support functions, including home automation, data capture, device automation, providing alerts, automated home delivery, medical services, system personalization, and numerous other applications and functions.

SUMMARY

Various embodiments of the present disclosure provide integrated circuit die element comprising one or more field-programmable gate arrays (FPGAs) elements. A reconfigurable dual function memory array includes a plurality of reconfigurable memory array blocks. Each reconfigurable memory array block is capable of configuration and reconfiguration as a storage memory array block or as a control logic array block for controlling at least a portion of the one or more FPGA elements. A control logic circuit functions to configure each reconfigurable memory array block as the respective memory array block or as the respective logic array block for controlling the one or more FPGA elements.

The 3D-die stacking reconfigurable processor described herein can be used in a variety of different applications. For example, mobile Internet of Things (IoT) edge devices have two key characteristics, namely, (1) mobility and (2) connectivity (including security). In some embodiments of the present invention, mobile IoT edge devices can use a reconfigurable processor as described above to address mobility. And, mobile IoT edge devices can use a connectivity unit, such as a 5G or WiFi modem, to address connectivity.

Traditional 5G modems (such as those used in mobile phones) have an embedded processor (CPU), 5G Phy-layer, and other components (such as GPU, DSP, display, memory, modem, connectivity, security, multimedia, USB ports, SATA ports, etc.). Although widely adopted, the 5G modem architecture comes with overall system complexity, increased software development tasks, and high system development and manufacturing costs (including licensing fees and die costs). Software development tasks require users to handle multiple different software stacks, including a first stack for the main system processor and a second stack for the 5G modem processor. There is a need to arbitrate between the two processors. For mobile IoT edge devices, embedded systems or mobile wireless robot applications, the standalone 5G modem with embedded processor is overkill, adding unnecessary cost and possibly reducing system performance.

Some embodiments of the present invention provide a mobile IoT edge device that includes a processor-independent 5G modem that includes and interface to cooperate with the processor and the reconfigurable memory of the main processor unit of the mobile IoT edge device. Some possible advantages of using a processor-independent 5G modem includes reduced die cost, reduced software development tasks, and reduced energy consumption. In some embodiments, there is no longer a need to arbitrate between the two processors, and the system can operate using only a single software stack.

Further, using the reconfigurable processor unit described above may provide several other benefits. Silicon design may integrate multiple functions and architectures. System on a Chip (SOC) (e.g., ASIC) design may enable integration of logic (MCU) with embedded memory and analog circuitry (such as PCIx and USBx SerDes Phy). SOC may integrate onboard voltage regulators to provide multiple voltages for different types of on-chip circuits. SerDes Phy and regulators are analog circuitries, which are notoriously unable to scale and thus take a disproportionate amount of silicon area and consume more power than digital circuits. For advanced CMOS process design, it is not cost-effective. Memory-centric design requires non-volatile onboard memory. Current Flash memory is unable to scale below 28 nm. Emerging non-volatile memory is not ready for integration with CMOS technologies below 10 nm. Leveraging heterogeneous 3D integration of the processor, memory and logic layer (FPGA/PLD), which connects the host's I/O ports to the resident data, improves processing-in-memory architecture's memory performance.

Some embodiments of the present invention provides a mobile Internet-of-Things (IoT) edge device, comprising a reconfigurable processor unit including a substrate; a die stack coupled to the substrate and having a field-programmable gate array (FPGA) die element and a reconfigurable die element capable of serving as storage memory or as configuration memory based on configuration information; and a processor coupled to the substrate and configured to cooperate with the die stack for processing data; and a processor-independent connectivity unit coupled to the reconfigurable processor unit and including an antenna; a radio-frequency chip (RFIC) coupled to the antenna and configured to receive incoming signals and transmit outgoing signals over the antenna; circuitry configured to translate the incoming signals to incoming data or transmit the outgoing data to outgoing signals; and a system interface configured to transmit the incoming data to the reconfigurable processor unit for processing, and configured to receive the outgoing data from the reconfigurable processor unit.

The connectivity unit operates on a 5G band or on WiFi. The circuitry may be a die element on the die stack. The connectivity unit may be coupled to the substrate. The system interface may include a direct memory access (DMA) controller and a first in, first out (FIFO) buffer. The mobile IoT edge device may further comprise sensors and motors, wherein the sensors and motors are coupled to the reconfigurable processor unit via host input/output (I/O)

ports. The mobile IoT edge device may further comprise a power supply configured to power the reconfigurable processor unit. The mobile IoT edge device may further comprise secure download ports for receiving firmware or configuration updates.

Some embodiments of the present invention provides a method performed by a mobile Internet-of-Things (IoT) edge device, comprising receiving incoming signals from an antenna by a Phy-layer on a processor-independent connectivity unit, the Phy-layer including a radio-frequency chip (RFIC); translating the incoming signals to incoming data by circuitry on the Phy-layer of the processor-independent connectivity unit; and transmitting the incoming data by a system interface of the processor-independent connectivity unit to a reconfigurable processor unit for processing, the reconfigurable processor unit having a substrate, a die stack coupled to the substrate and having a field-programmable gate array (FPGA) die element and a reconfigurable die element capable of serving as storage memory or as configuration memory based on configuration information, and a processor coupled to the substrate and configured to cooperate with the die stack for processing the incoming data.

The connectivity element may operate on 5G or WiFi. The circuitry may be a die element on the die stack. The connectivity unit may be coupled to the substrate. The system interface may include a direct memory access (DMA) controller and a first in, first out (FIFO) buffer. The method may further comprise using the incoming data to control a motor, wherein the motor is coupled to the reconfigurable processor unit via host input/output (I/O) ports. The method may further comprise receiving power from a power supply coupled to the reconfigurable processor unit. The method may further comprise receiving firmware or configuration updates via secure download ports.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. The drawings are for purposes of illustration and description only and are not intended as a limit of the invention.

BRIEF DESCRIPTION OF THE DRAWINGS

FIG. 11 is a block diagram of an example of setting status registers for scan logic and reference array for case A3 and case A4 according to some embodiments.

DETAILED DESCRIPTION

In various embodiments, reconfigurable dual-function function cell arrays can be configured and reconfigured into logic or storage memory cells on the same integrated circuit die. For example, a reconfigurable dual-function function cell array may include a memory array (or matrix) of programmable memory cells that can be configured and reconfigured to function either as control memory for FPGA logic or as storage memory (e.g., cache). For sake of simplicity, the terms "configure" or "reconfigure" may each refer to a configuration (e.g., an initial configuration) and/or a reconfiguration of a prior configuration (e.g., a second or subsequent configuration).

In some embodiments, a processing system includes any number of such reconfigurable dual-function function cell arrays. A control logic circuit of the processing system may configure programmable cells of a reconfigurable dual-function function cell array to function as a storage memory array, and configure programmable cells of another reconfigurable dual-function function cell array to function as a logic array. If, for example, more storage memory (e.g., fast access memory, cache, etc.) is needed for a particular application, the processing system may reconfigure the programmable cells operating as a logic array to function as a storage memory array. In another example, if additional logic is required, the processing system may reconfigure the programmable cells operating as a storage memory array to function as a logic array. Since storage memory and logic functionality may be increased or decreased as needed (e.g., on demand), external storage memory may not be needed or may be needed less often. This can improve system performance and/or consume less energy than traditional systems.

In various embodiments, the reconfigurable dual-function cell arrays may use non-volatile memory and/or volatile memory. Non-volatile memory may include phase change memory (PCM), MRAM, and EEPROM cells, and/or the like. PCM, in particular, may allow chip designs to provide high-density, low power, programmable and non-volatile memory devices. PCM may be beneficial in artificial intelligence chip design architecture, computation-in-memory (CIM), and/or the like. In one example, PCM may be used for CIM in neuromorphic computing.

Figure 1:
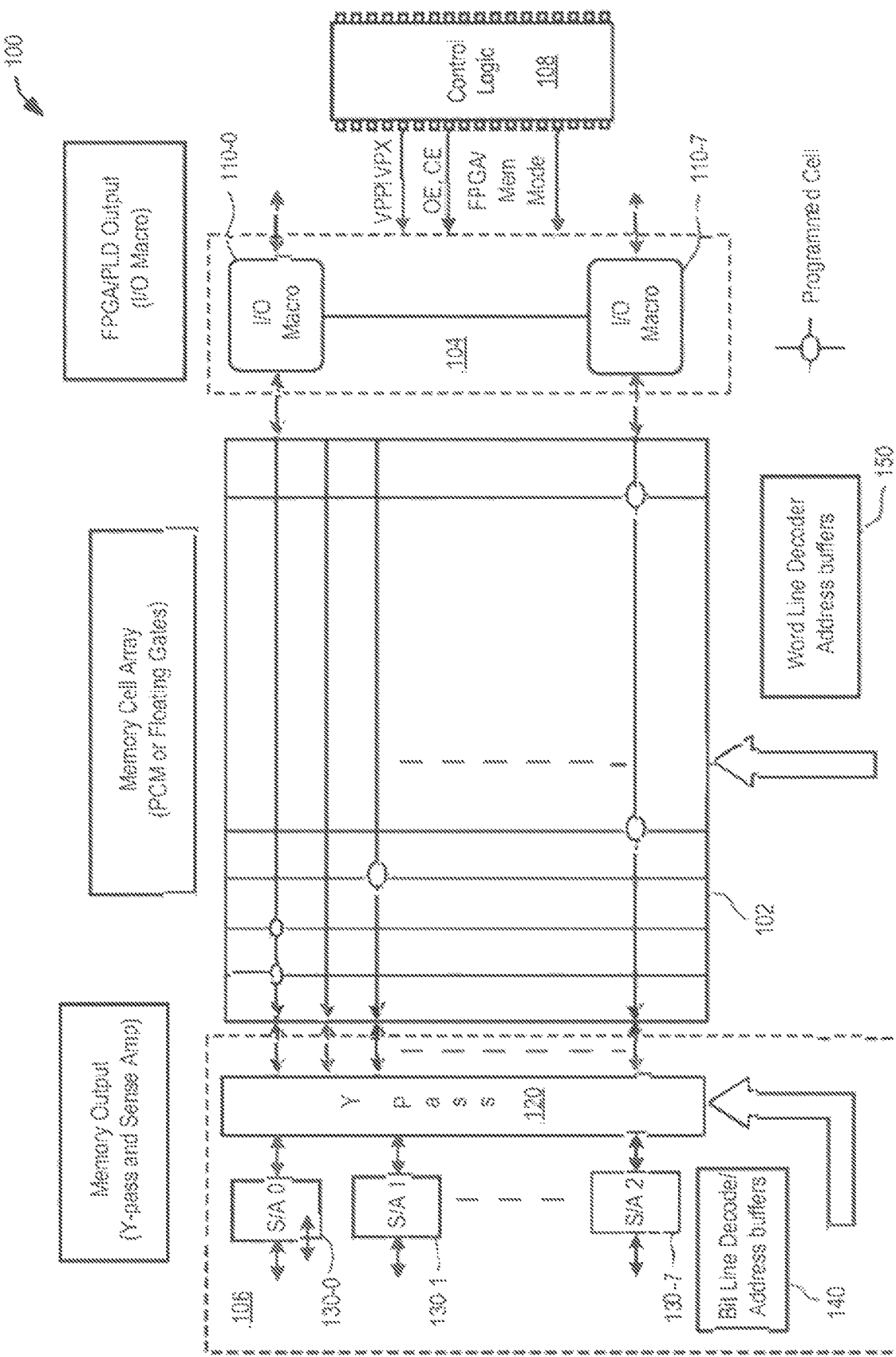
FIG. 1 is a block diagram of a processing system including a reconfigurable dual function cell array according to some embodiments.

FIG. 1 is a block diagram of a processing system 100 including a reconfigurable dual function cell array 102 according to some embodiments. The processing system 100 further includes FPGA elements 104 and storage memory elements 106. In some embodiments, the processing system 100 is implemented on a single integrated circuit die. In other embodiments, the processing system 100 is implemented on multiple integrated circuit dies. For example, the reconfigurable dual-function cell array 102, the FPGA circuitry 104, and/or the storage memory circuitry 106 may be implemented across multiple integrated circuit dies. The processing system 100 further includes control logic 108 that functions to configure the various cells of the reconfigurable dual-function cell array 102 as a memory array or as a logic array.

The reconfigurable dual-function function cell array 102 includes one or more arrays (e.g., a single array or a matrix of arrays) of programmable cells that can be reconfigured to function either as control memory cells for the FPGA elements 104 or as storage memory cells for the memory elements 106. As indicated above, the programmable cells may be non-volatile memory cells or volatile memory cells. The storage memory cells may function as fast access memory cells (e.g., cache), and the control memory cells may function as configuration data for configuring an FPGA. For example, the configuration data stored in the control memory cells can be used to configure the FPGA elements 104 to perform complex combinational functions, and/or relatively simple logic gates (e.g., AND, XOR). In some embodiments, both logic and memory cells can be created on the same reconfigurable dual-function cell array 102.

Any number of such reconfigurable dual-function function cell arrays 102 may be included in the processing system 100. In some embodiments, the processing system 100 can configure programmable cells of one reconfigurable dual-function function cell array 102 to function as a memory array, and configure programmable cells of another reconfigurable dual-function function cell array 102 to function as a logic array. If, for example, more memory is needed for a particular application, the processing system may reconfigure a logic array to function as a memory array. If, for example, more logic is needed for a particular application, the processing system may reconfigure a memory array to function as a logic array. Since memory and logic functionality may be increased or decreased as needed, use of external memory may be avoided. This can improve system performance and/or consume less energy than traditional systems.

Figure 15:
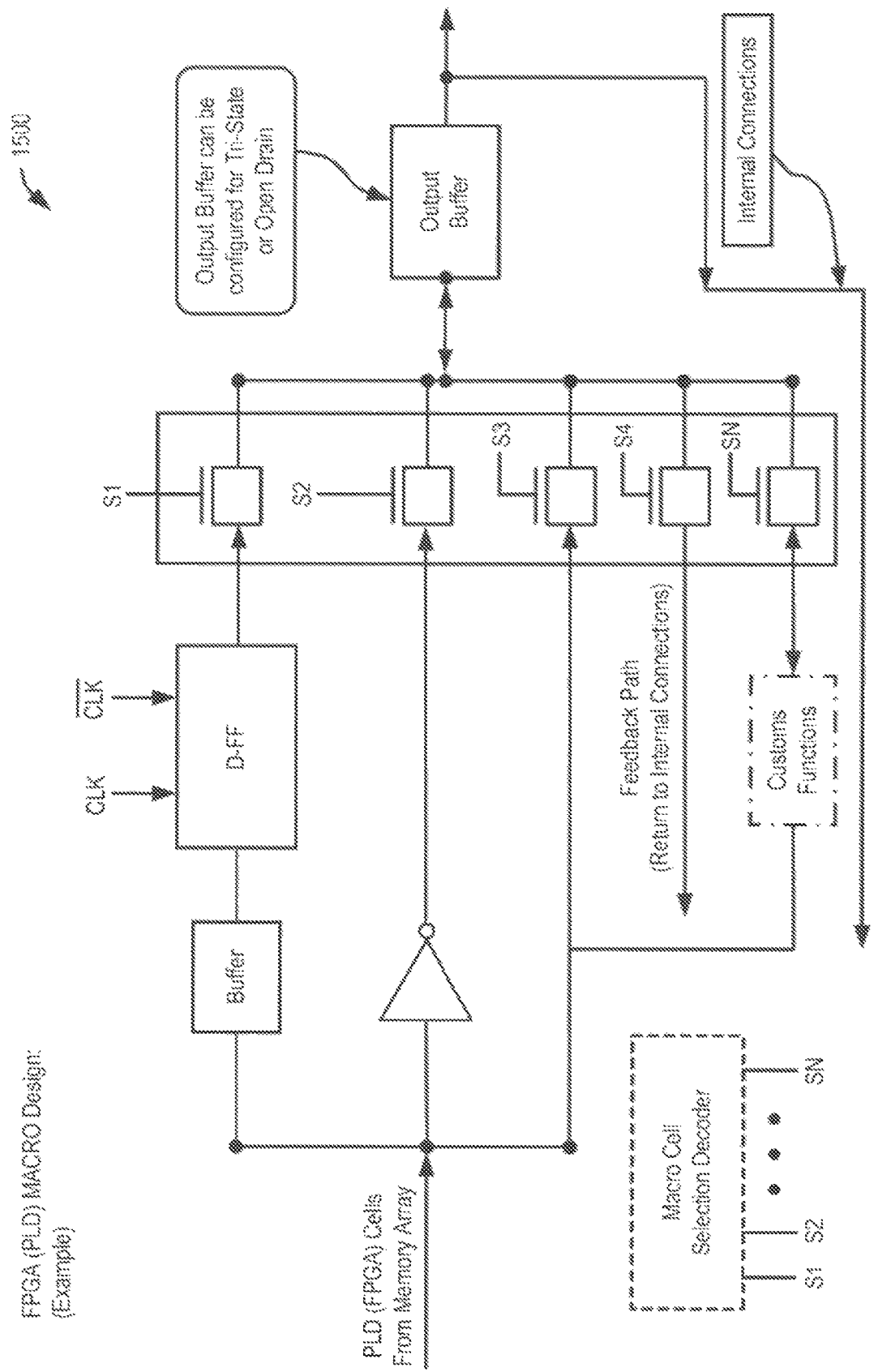
FIG. 15 is a block diagram of a reconfigurable dual function cell array macro design according to some embodiments.
Figure 16:
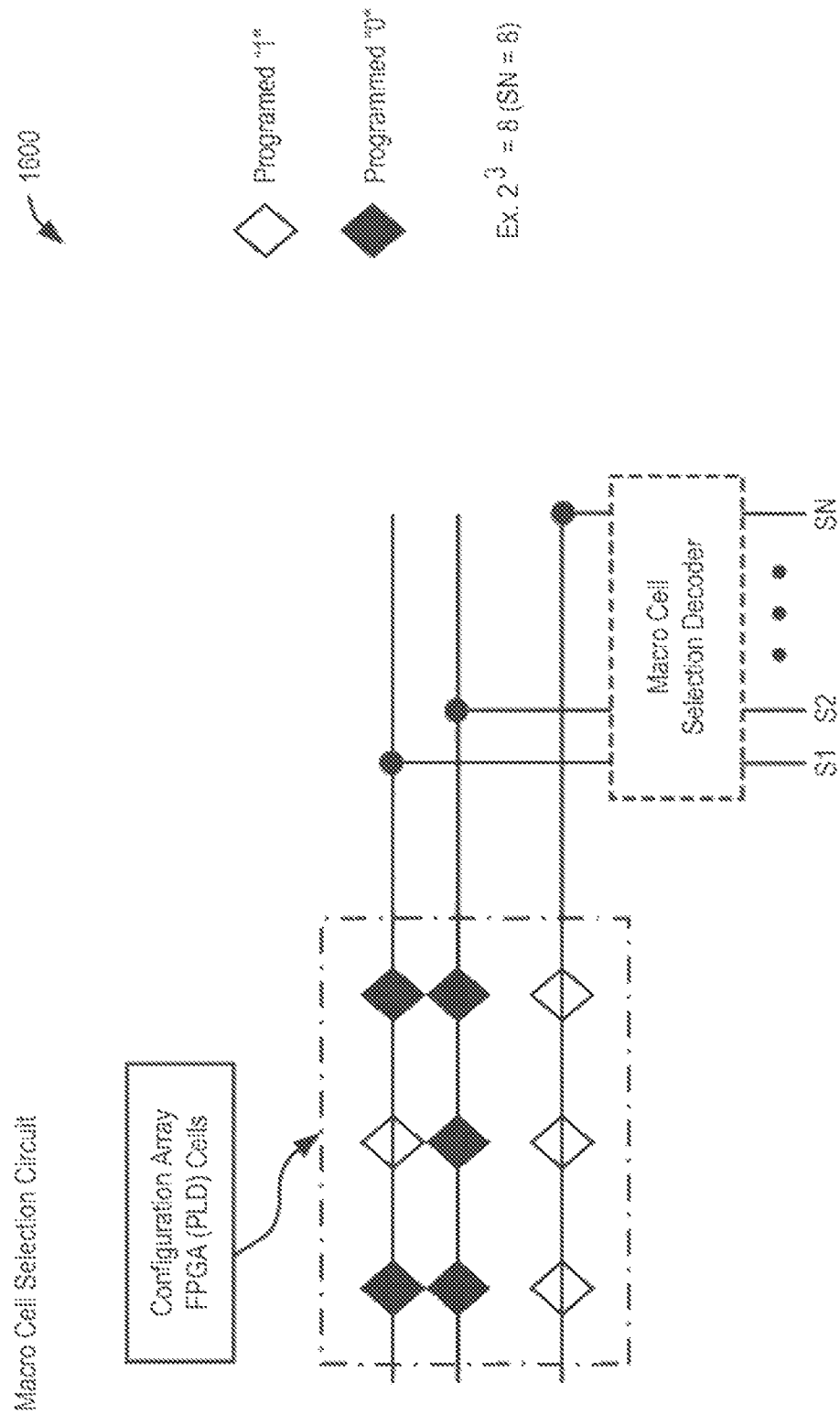
FIG. 16 is a block diagram of a reconfigurable dual function cell array macro cell selection circuit according to some embodiments.
Figure 17:
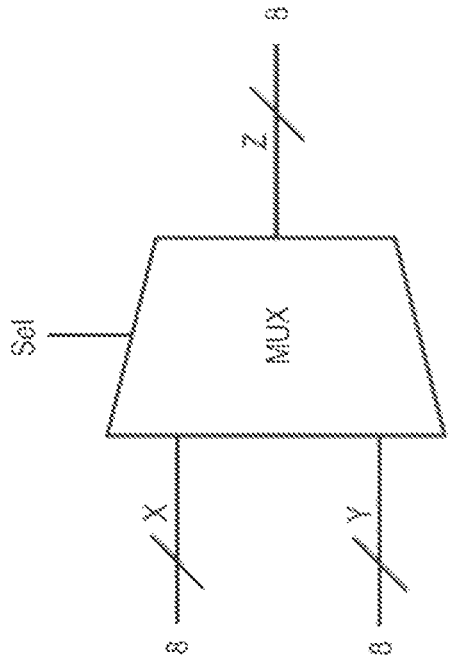
FIG. 17 is a block diagram of custom function block design examples according to some embodiments.
Figure 17:
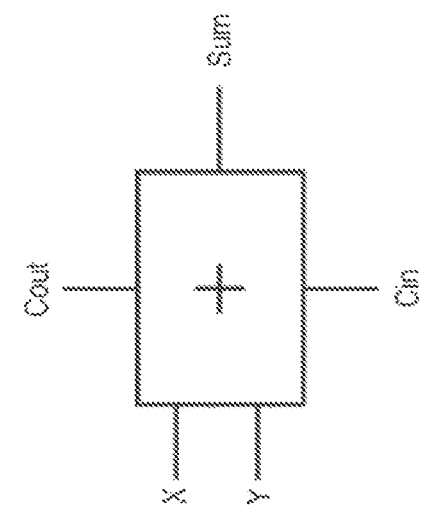

The FPGA elements 104 comprise circuitry configured to provide functionality of an FPGA and/or programmable logic device (PLD). The FPGA elements 104 include I/O macro circuits 110-0 to 110-1. The I/O macro circuits 110 function to provide complex combinational functions, and/or relatively simple logic gates (e.g., AND, XOR). Example logic function block diagrams are shown in FIG. 17. Although eight I/O macro circuits 110 are shown here, there may be any number of such circuits (e.g., based on the number of rows/columns in the reconfigurable dual-function cell array 102). Further example designs of an I/O macro circuit 110 are shown in FIGS. 15 and 16.

The control logic 108 functions to configure (e.g., program) the memory cells of the reconfigurable dual-function cell array 102 as either storage memory cells or control memory cells. Configuration may occur after manufacturing (e.g., in the field). For example, various applications may have different storage memory and/or logic requirements. The control logic circuit 108 may configure, either automatically or in response to user input, the cells of the reconfigurable dual-function cell array 102 based on the requirements. As requirements change, cells may be once again be reconfigured. In some embodiments, individual cells of the reconfigurable dual-function cell array 102 may have a default configuration as a storage memory cells or a control memory cells. In some embodiments, a default configuration may be a null configuration, and may be reconfigured to either an storage memory cell or control memory cell.

The storage memory elements 106 comprise circuitry for memory operations, e.g., a read and/or write. The storage memory elements 106 include a Y-pass circuit 130 and sense amplifiers 130-0 to 130-7. Although eight sense amplifiers 130 are shown here (one sense amplifier 130 for each column of cells of the reconfigurable dual-function cell array 102), it will be appreciated that any appropriate number of number of sense amplifiers 130 (e.g., based on the number of columns in the reconfigurable dual-function cell array 102) may be used. Generally, a sense amplifier 130 comprises circuitry for reading data from the reconfigurable dual-function cell array 102 (e.g., from the cells programmed as storage memory cells). The sense amplifiers 130 function to sense low power signals from a bitline of the reconfigurable dual-function cell array 102 that represents a data bit (e.g., 1 or 0) stored in a storage memory cell, and amplify the small voltage swing to recognizable logic levels so the data can be interpreted properly by logic outside the reconfigurable dual-function cell array 102.

In some embodiments, a processing system 100 including a matrix of reconfigurable dual-function function cell arrays may be implemented on a single integrated circuit die. The single integrated circuit die may be used independently of other integrated circuit dies and/or be stacked with other integrated circuit dies (e.g., a microprocessor die, a memory die, an FPGA die) in various configurations to further improve performance. For example, a stack may include any combination of layers. Layers may each be a single die. One layer may include the processing system 100 and another layer may include a microprocessor die.

Storage Memory Mode

In a storage memory mode of operation, the control logic circuit 108 sets a configuration value to memory mode (e.g., "low") to configure at least a block (e.g., a sub-array) of the reconfigurable dual-function cell array 102 as storage memory. In some embodiments, the storage memory mode disables the FPGA functions (e.g., output functions of the FPGA elements 104). Bit line decoders/address buffers 140, word line decoders/address buffers 150 and/or Y-pass 120 address cells or rows of cells. Data is transferred in or out of the memory cells. The sense amplifiers 120 connect to internal or external wiring channels.

FPGA Mode

In an FPGA mode of operation, the control logic circuit 108 sets a configuration value to logic mode (e.g., "high") to configure at least a portion of the reconfigurable dual-function cell array 102 for performing logic functions. In some embodiments, the FPGA mode disables memory circuit 106 and enables FPGA elements 104. Address buffers may supply the address to the reconfigurable dual-function cell array 102 to perform the logic function. The output of the reconfigurable dual-function cell array 102 (e.g., an AND-OR array) connects to I/O macro circuits 110. The I/O macro circuits 110 receive the configuration data from the logic arrays. The configuration data configures the I/O macro circuits 110 to generate results based on the configuration data.

Figure 2:
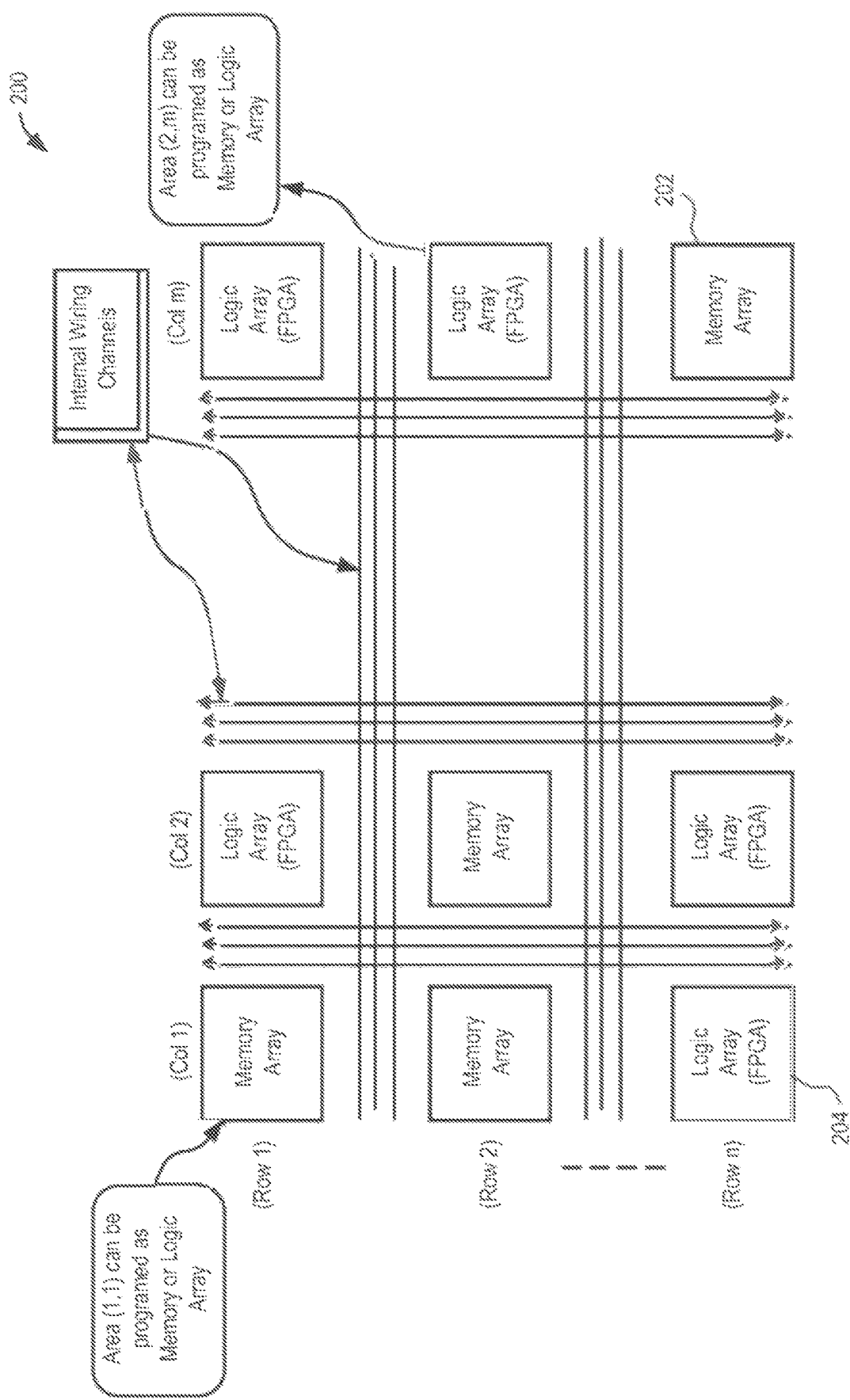
FIG. 2 is a block diagram of a matrix of reconfigurable dual function cell arrays according to some embodiments.

FIG. 2 is a block diagram of a matrix 200 of reconfigurable dual function cell arrays 102 according to some embodiments. The matrix 200 includes storage memory and logic arrays. As shown, some arrays may be programmed as storage memory arrays and some arrays may be programmed as logic arrays. When a design or application requires more storage memory arrays, the storage memory array can be reconfigured (e.g., reprogrammed) from a logic memory array into a storage memory array. When a design or application requires more logic arrays, the storage memory array can be reconfigured (e.g., reprogrammed) from a storage memory array into a logic array. This approach can increase the efficacy of memory arrays usage and can reduce energy consumption.

Figure 3:
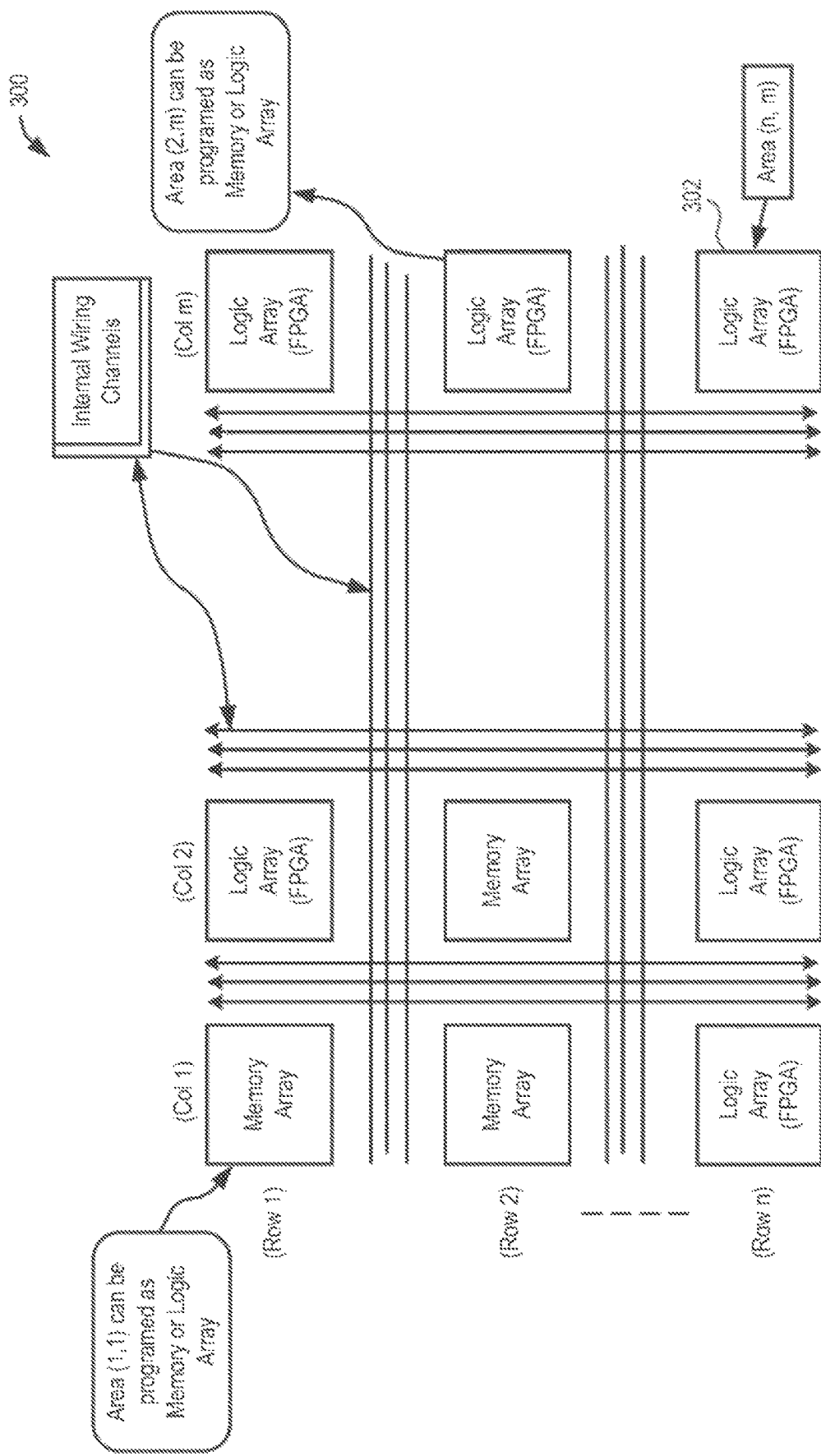
FIG. 3 is a block diagram of a matrix of reconfigurable dual function cell arrays according to some embodiments.

In the example of FIG. 2, the matrix 200 includes a storage memory array 202 at area n,m and a logic array at area n,1 of the matrix 200. The processing system 100 can reconfigure any of the arrays. For example, as shown in FIG. 3, the processing system 100 can reconfigure the storage memory array 202 at area n,m to be a logic array (shown as logic array 302).

Figure 4:
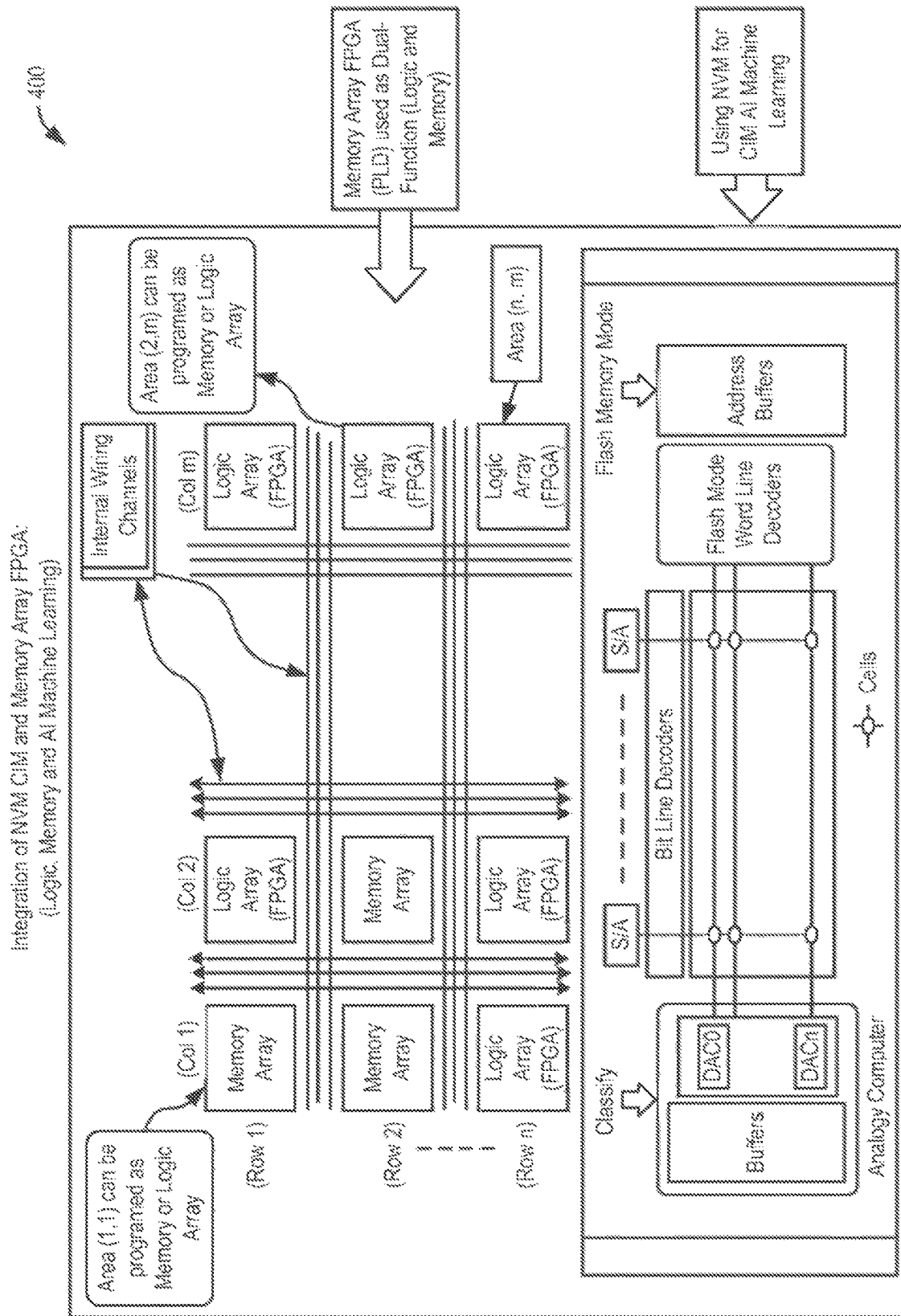
FIG. 4 is a block diagram of an integration of non-volatile memory computation-in-memory and a matrix of reconfigurable dual function cell arrays according to some embodiments.
Figure 5:
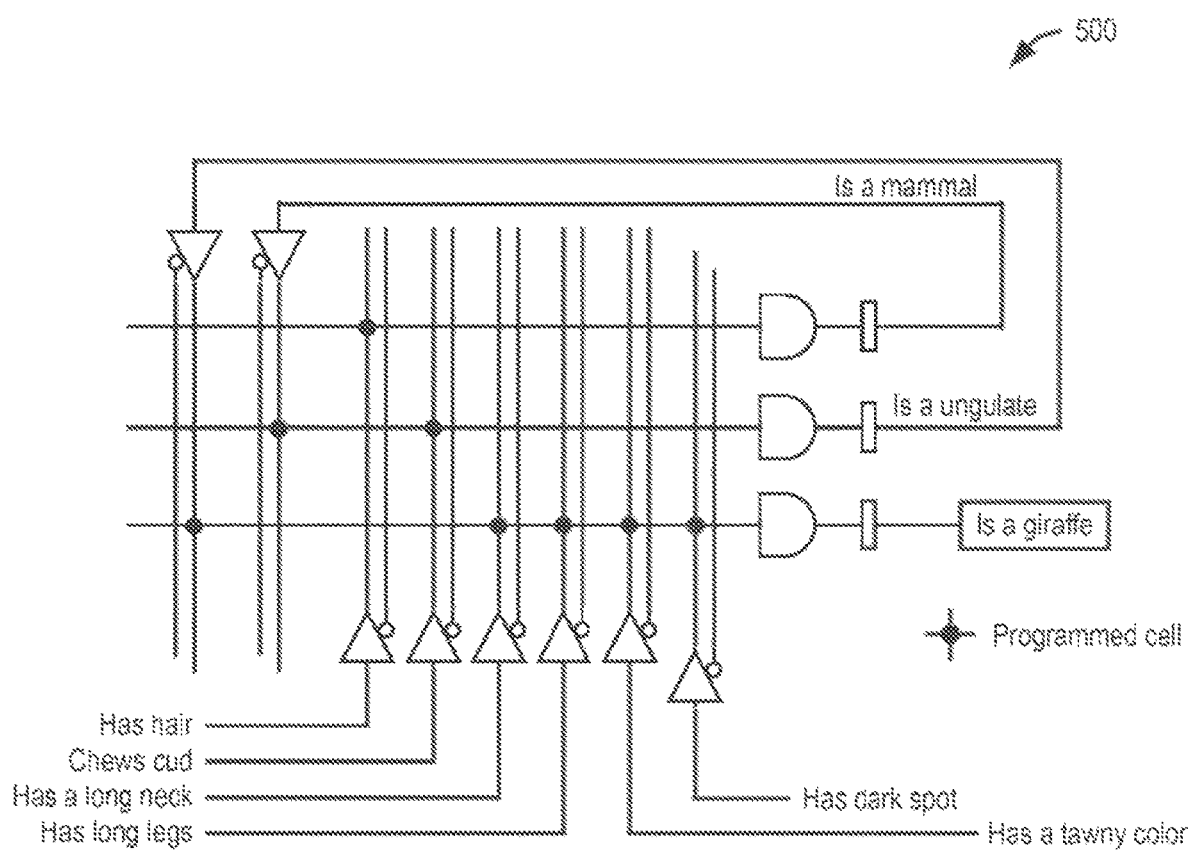
FIG. 5 is a block diagram of a reconfigurable dual function cell array logic implementation of artificial intelligence (AI) identification programming according to some embodiments.

The systems and methods described herein may be particularly beneficial for CIM and artificial intelligence (AI) applications. FIG. 4 shows an example of the integrations of non-volatile memory CIM and a matrix of reconfigurable dual-function cell arrays 102. FIG. 5 shows implementation of an AI identification program.

Figure 6:
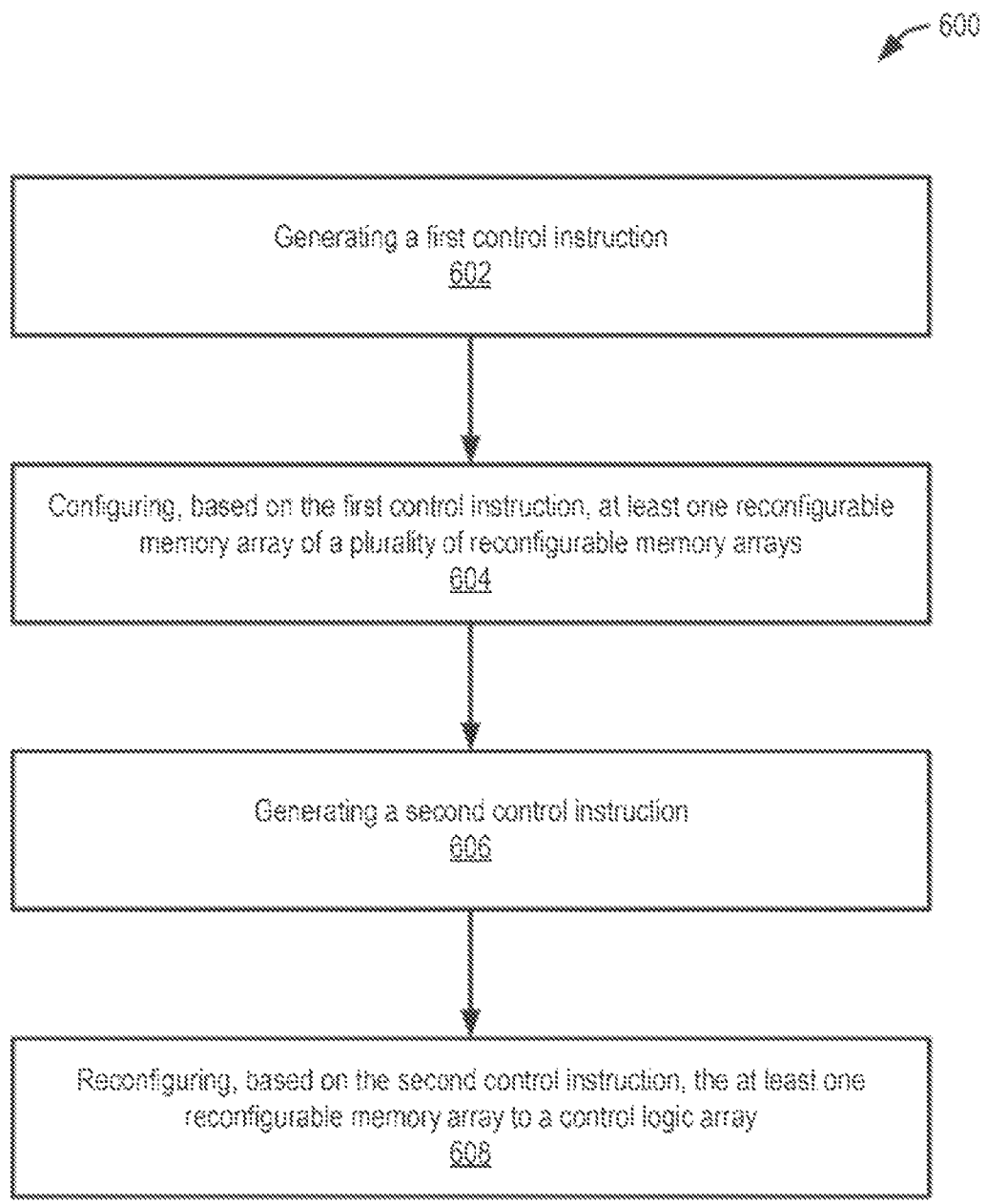
FIG. 6 is a flowchart of a method of configuring and reconfiguring one or more reconfigurable dual function cell arrays according to some embodiments.

FIG. 6 is a flowchart of a method 600 of configuring and reconfiguring one or more reconfigurable dual function cell arrays 102 according to some embodiments. In this and other flowcharts and/or sequence diagrams, the flowchart illustrates by way of example a sequence of steps. It should be understood the steps may be reorganized for parallel execution, or reordered, as applicable. Moreover, some steps that could have been included may have been removed to avoid obscuring the invention and for the sake of clarity and some steps that were included could be removed, but may have been included for the sake of illustrative clarity.

In step 602, a processing system (e.g., processing system 102) generates a first control instruction. For example, the first control instruction comprises an output instruction (e.g., signal) to set storage memory functionality of a block (e.g., a sub-array) of storage memory elements (e.g., storage memory elements 106) for one or more programmable cells of at least reconfigurable dual-function cell array (e.g., reconfigurable dual-function cell array 102). In some embodiments, a control logic circuit (e.g., control logic circuit 108) generates the first control instruction.

In step 604, the processing system configures, based on the first control instruction, at least one reconfigurable memory array of a plurality of reconfigurable memory arrays (e.g., matrix 200) as a storage memory array (e.g., memory array 202). Each reconfigurable memory array of the plurality of reconfigurable memory arrays may be capable of configuration and reconfiguration as a storage memory array (e.g., fast access memory/cache) or a control logic array for controlling one or more field-programmable gate arrays (e.g., I/O macro unit(s) 110 and/or other element(s) of FPGA elements 104) of the integrated circuit die element. In some embodiments, the control logic 108 establishes the configuration.

In step 606, the processing system generates a second control instruction. For example, the second control instruction may comprise an instruction (e.g., signal) to set FPGA functionality for the one or more programmable cells (e.g., a sub-array) of the at least one reconfigurable dual-function cell array (e.g., that were programmed as storage memory in step 604). In some embodiments, the control logic 108 generates the second control instruction.

In step 608, the processing system reconfigures, based on the second control instruction, the at least one reconfigurable memory array to a control logic array (e.g., logic array 302). For example, the control logic may reconfigure at least a portion of the programmable memory cells operating as the storage array to be reconfigured as the logic array.

Similar steps may also be performed to reconfigure logic arrays to memory arrays. In some embodiments, cells may be reconfigured any number of times.

In some embodiments, the control logic circuit 108 functions to configure and reconfigure at least one of the plurality of reconfigurable memory arrays automatically or based on user input after manufacturing and deployment of the integrated circuit die element. Accordingly, processing system may be more flexible and/or adaptable than prior solutions.

In one example, the plurality of reconfigurable memory arrays comprises a matrix of reconfigurable memory arrays (e.g., matrix 200). A particular row (e.g., row n) of the matrix of reconfigurable memory arrays includes a first reconfigurable memory array (e.g., memory array 202) being any of configured or reconfigured as a particular storage memory array, and a second reconfigurable memory array (e.g., logic array 204) being any of configured or reconfigured as a particular control logic array for controlling one or more field-programmable gate arrays (I/O macro unit(s) 110 and/or other element(s) of FPGA elements 104) of the integrated circuit die element. The storage memory array may operate as a fast access memory array (e.g., cache).

It will be appreciated that reconfigurable dual function cell array 102 may include Through Silicon Vias (TSVs) for interconnecting with a microprocessor as described in U.S. Pat. No. 7,126,214. Further, it will be appreciated that a system can use any number of reconfigurable dual function cell arrays 102, e.g., one stacked upon another. For example, a system can use a microprocessor coupled to a die package, and one or more reconfigurable dual function cell arrays 102 stacked on the microprocessor to create a stacked die product. The distance from the microprocessor may affect the relative performance of the array 102. Various algorithms may be used to control which layer the microprocessor uses.

Non-Volatile Memory Embodiments

FIGS. 7-13 relate to embodiments utilizing non-volatile memory. Under some approaches, non-volatile memory data read-out operations are performed using fixed references as reference input for a sense amplifier. In one example, a fixed reference includes one fixed reference point for sense amplifiers to sense data out. However, fixed reference voltages cannot compensate for non-volatile memory cells' electrical variations (CD) and/or manufacturing process deviations, which may create significant electrical changes of cell's read current. Further, the physical size of non-volatile memory cells is shrinking and complex process technology create more cell electrical variations, which can drastically impact non-volatile cells' electrical characteristics. Fixed references cannot manage non-volatile memories cells' wide electrical margin, PCM reliability issues, resistance drift, cell variability, thermal crosstalk and circuit noise from read/write circuitry, ambient temperature, and/or the like.

Figure 7:
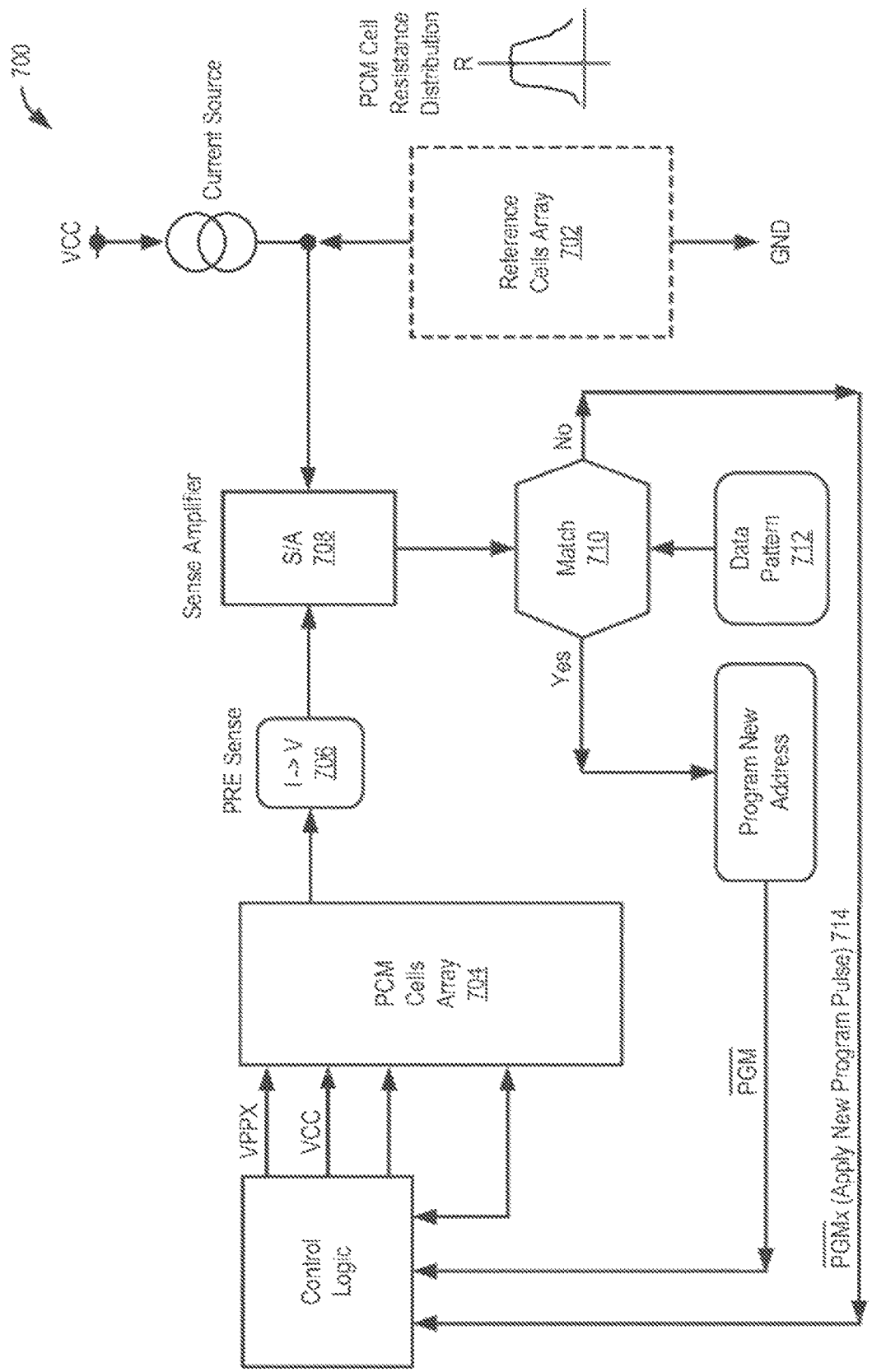
FIG. 7 is a block diagram of a Phase Change Memory (PCM) circuit design having non-volatile memory programming control logic and intelligent program mode with data read out circuits according to some embodiments.

FIG. 7 is a block diagram of a Phase Change Memory (PCM) circuit design 700 having non-volatile memory programming control logic and intelligent program mode with data read out circuits according to some embodiments. The circuit design 700 includes a fixed reference array 702. As noted above, fixed reference arrays may be ineffective for non-volatile memory embodiments.

The PCM cells array 704 includes a reconfigurable dual-function function cell array with PCM. The PRE S/A (I/V) 706 includes pre-sense amplifier circuits which may convert current level to voltage levels. The sense amplifier 708 includes a memory array sense amplifier.

The compare (or, match) circuit block 710, if the output of sense amplifier 708 matches with program data pattern 712, is set to YES, and loads the next byte data. If there is no match, enable NO and apply program pulse 714 again to reprogram the current bytes to repeat the programming step.

The PGM circuit includes memory cells program control logic, The PGM may determine whether a memory cell is under programming or read function.

If a match occurs, start next byte to program next (new) memory. Set a PGM pulse. The PGM(bar) is off.

The reference cells array 702 includes pre-determined reference cells as the input of the sense amplifier 708.

Figure 8:
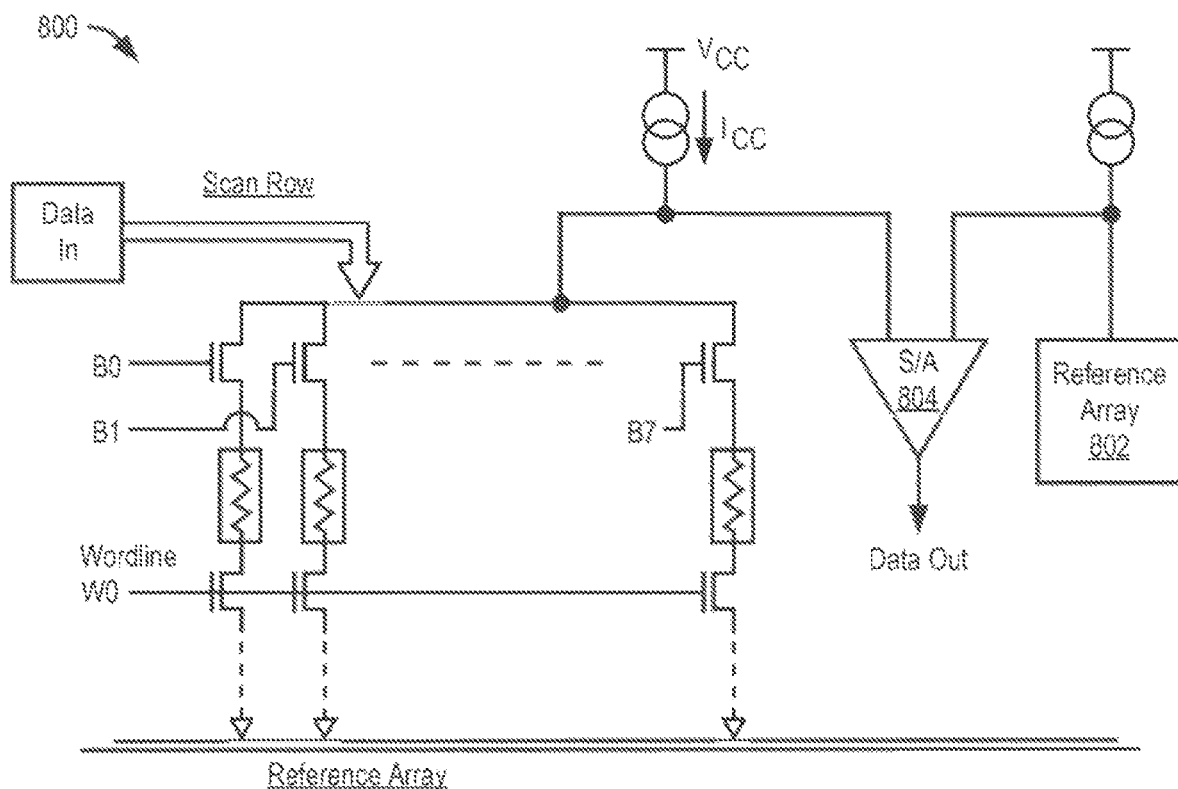
FIG. 8 is a block diagram of a circuit design having a scan row and fixed sense amplifier reference cell according to some embodiments.

FIG. 8 is a block diagram of a circuit design 800 having a scan row and fixed sense amplifier reference according to some embodiments. The circuit design 800 includes a dynamic reference array 802 and sense amplifier 804.

FIG. 8 shows a scan row-circuit diagram of PCM memory cell array and scan row block. B0, B1, to B7 are bit line decoder control gates. The word line W0 is the word line of memory cells. The data-in (0-7) is the data input for programming data during memory scan setup.

Figure 9:
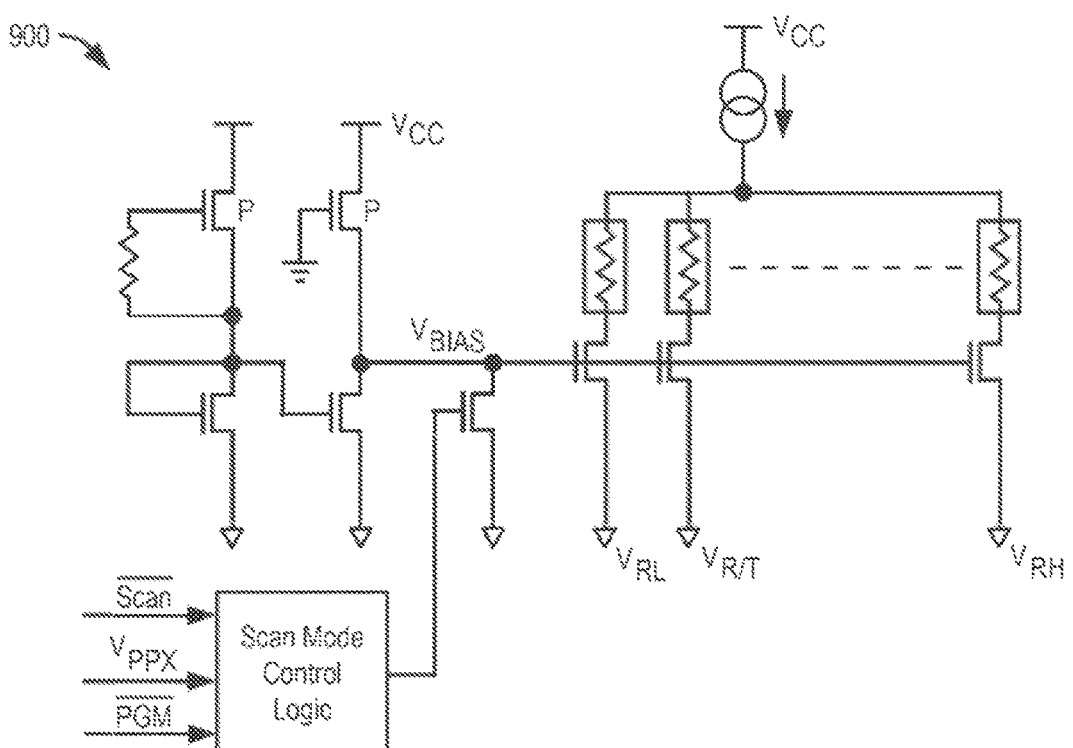
FIG. 9 is a block diagram of a circuit design having a dynamic reference array as sense amplifier reference voltages according to some embodiments.

FIG. 9 is a block diagram of a circuit design 900 providing a dynamic reference array as sense amplifier reference voltages according to some embodiments.

In some embodiments, the circuit design 900 is the circuit diagram of the dynamic reference array 802. The V-bias is the reference voltage. The scan mode control logic enables the V-bias, the fixed reference voltage (pre-determined by design), and/or adjusting the dynamic reference array reference voltage, such as $V_{RL}$, $V_{RT}$ ... $V_{RH}$. The selections of $V_{RL}$ or $V_{RH}$ are determined by the outcome of the scan row's results. The voltage values of the sense amplifier 804 reference side depended on by the V-bias, VRL, and/or VRH, etc. After the scan mode determines the $V_{RH}$, $V_{RT}$, or $V_{RH}$ values, the sense amplifier reference voltage value may be a fix-voltage. During a normal read/write mode, the scan mode control logic may be "Low." The V-bias may be a fixed reference voltage.

Generally, a sense amplifier (e.g., sense amplifier 130) may sense bits from a bitline that represents a data bit (1 or 0) stored in a memory cell, and amplify the small voltage swing to recognizable logic levels so the data can be interpreted properly by logic outside the memory. Under traditional approaches, a sense amplifier uses a fixed reference value. For example, data may range from 1 volt (V) to 5V, and a fixed reference value may be 3V. If the signal is above the fixed reference value, then the sense amplifier may set or otherwise indicate the signal as "high", and if the signal is below the fixed reference value, then the sense amplifier may set or otherwise indicate the signal as "low". However, because non-volatile memory has reliability issues, resistance drift, cell variability, thermal crosstalk and circuit noise from read/write circuitry, and/or be susceptible to changes in temperature due to ambient temperature and/or other factors, the voltages stored in memory cells may fluctuate. Accordingly, a fixed reference value may be ineffective.

Figure 14:
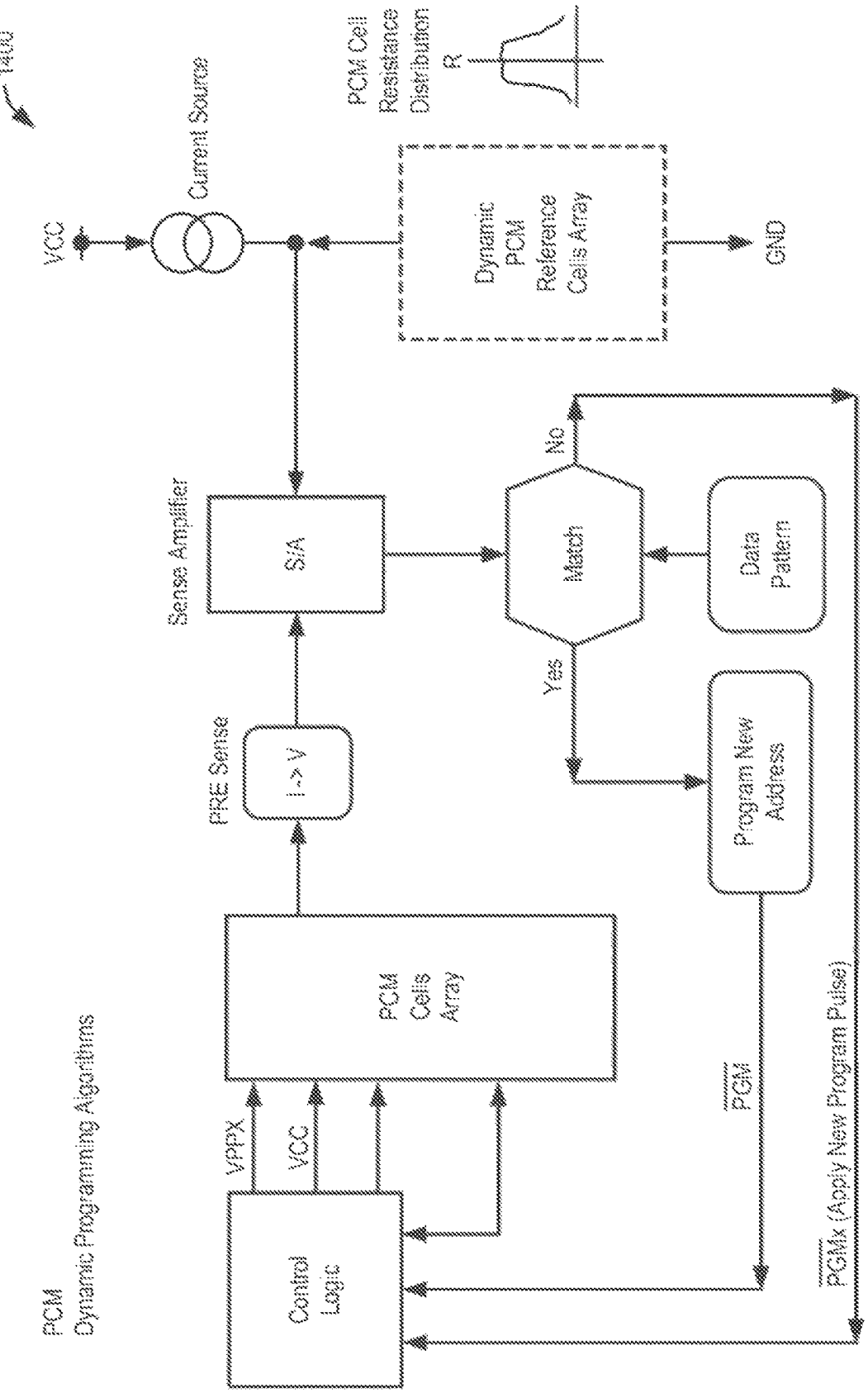
FIG. 14 is a block diagram of dynamic programming algorithms according to some embodiments.

The circuit design 900 providing a dynamic reference array covers various factors for read/write circuits and may allow sense amplifiers (e.g., sense amplifiers 130) to cover wide range of cells' functionality. For example, the circuit design 900 may overcome PCM reliability issues, resistance drift, cell variability, thermal crosstalk and circuit noise from read/write circuitry, ambient temperature, and/or the like. Furthermore, the dynamic reference array circuit design 900 may improve product yield, translating to lower production cost. An example dynamic programming algorithm for a dynamic reference array is shown in FIG. 14.

In some embodiments, the dynamic reference array uses multiple references to increase a sense amplifier's sense ranges and improve data read out results. The Vbus voltages may be adjusted to cover the various factors, thereby providing a dynamic range of reference values. For example, as shown in the circuit design 900, a lower Vbus voltage may provide higher reference values, and lower Vbus voltages may provide lower reference values. Accordingly, even if voltages stored in the reconfigurable dual-function cell array 102 change in value (e.g., due to the factors described above) the changes may be managed by the dynamic reference array. In some embodiments, the circuit design 900 implements one or more dynamic reference array algorithms.

Scan Mode:
i. Programming and verifications on predefined Scan Rows.
   1. Apply program current/voltage to program selected cells (bytes), then remove program current pulses then switching to Read Mode and to verify the programming results by Read out Scan Row's data to compare the programming data-In.
   2. To select Reference Array's typical cell as Reference, Vref. RH.
   3. Programming Data-in match Read out Data. Set Status Register R0 to 1.
   4. Programming Data-in does not match Read out Data, Set Status Register R0 to 0
   5. To switch Reference cell to Reference, Vref. T., and to perform Scan Row Data read out.
   6. Programming Data-in match Read out Data. Set Status Register R1 to 1.

7. Programming Data-in does not match Read out Data, Set Status Register R1 to 0.
8. To switch Reference Cell to Reference, Vref. RL and to perform Scan Row Data read out.
9. Programming Data-in match Read out Data. Set Status Register R2 to 1.
10. Programming Data-in does not match Read out Data, Set Status Register R2 to 0.
11. Decode Status Register three bits, R0, R1, R2. Set Reference Cell by select two register bits are 1s. Examples are shown in FIGS. 10-13. Set Scan Mode is Done and different Vref levels.

Data-In: Data to be programmed.
Data-Out: Data Read out by Sense Amplifier.
Match: Data-In=Data-Out. (Programmed data matches Read-out data.)
Data Read Out Mode
After Reference Array cell was selected by Scan Mode (Done). Set the Selected Reference as future Read Mode and Programming/verification Mode's reference cell. No longer need to use Scan Mode anymore.
Programming/Data Verification Mode:
After Scan Mode (Scan Mode is Set). No longer need to scan data anymore. User may just to program the bits and verify to Data-in vs Data-out by using after Scan Mode's Reference.
By Passing Scan Mode:
For using bit to by passing Scan Mode is allowing Manual setup selecting one of the Reference Array Cell as reference for Sense Amplifier.
Enable Scan Mode:
To enable scan mode bit or decode scan mode to Enable scan Mode. After Enable scan Mode, Repeating Step A, Scan Mode.

Figure 10:
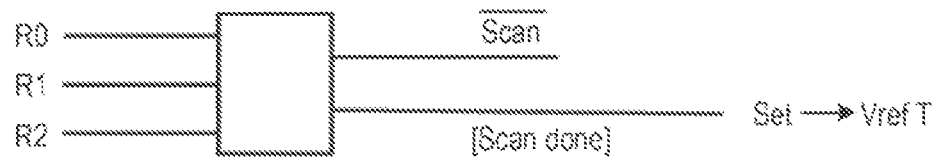
FIG. 10 is a block diagram of an example of setting status registers for scan logic and reference array for case A1 and case A2 according to some embodiments.

FIG. 10 is a block diagram of an example of setting status registers for scan logic and reference array for case A1 and case A2 according to some embodiments.

In case A1, example 1 is an 8-bit register to store the dynamic reference array's reference values, $V_{RL}$, $V_{RT}$, and $V_{RH}$.

In case A2, example 2 sets R0 to 0, R1(=RT), R2(=RH). In this case, the system SET→$V_{RT}$, $V_{RH}$.

In some embodiments, the system detects two passing V-reference stats to use one V-reference as input of the sense amplifier.

FIG. 11 is a block diagram of an example of setting status registers for scan logic and reference array for case A3 and case A4 according to some embodiments.

In case A3, example 3 SET→$V_{RL}$.

In case A4, example 4 SET→Not recommended case→Weak bit.

In some embodiments, the system detects two passing V-reference stats to use one V-reference as input of the sense amplifier.

Figure 12:
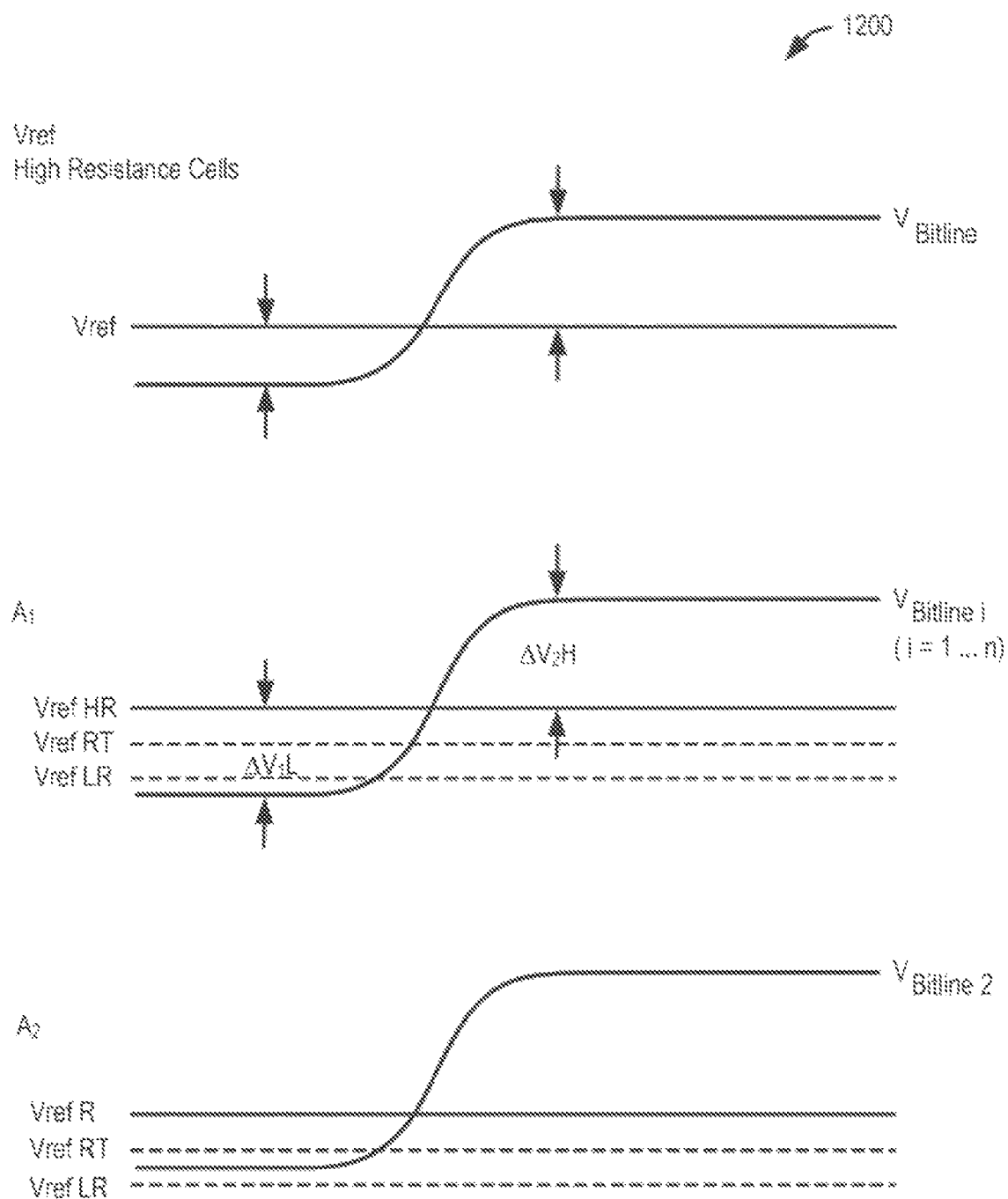
FIG. 12 is a block diagram of waveforms for sense amplifier for case A1 and A2 according to some embodiments.

FIG. 12 is a block diagram of waveforms for sense amplifier for case A1 and A2 according to some embodiments. Vbitline is Sense Amplifier Data-Out waveform vs. different three Reference voltages, Vref. HR, Vref, RT and Vref, LR.

In the example of FIG. 12, the sense amplifier bit-line voltage levels are shown versus the reference voltage generated from the dynamic reference array.

Wave forms of high resistance cells, fixed Verf. Are shown versus bit-line voltage level. Read "0" and "1".

In case A1, a status register setup is shown for wave-forms of VRH, VRT, and VRL versus bit-line voltage level.

In case A2, a status register setup is shown for wave-forms of VRH, VRT, and VRL versus bit-line voltage level.

Figure 13:
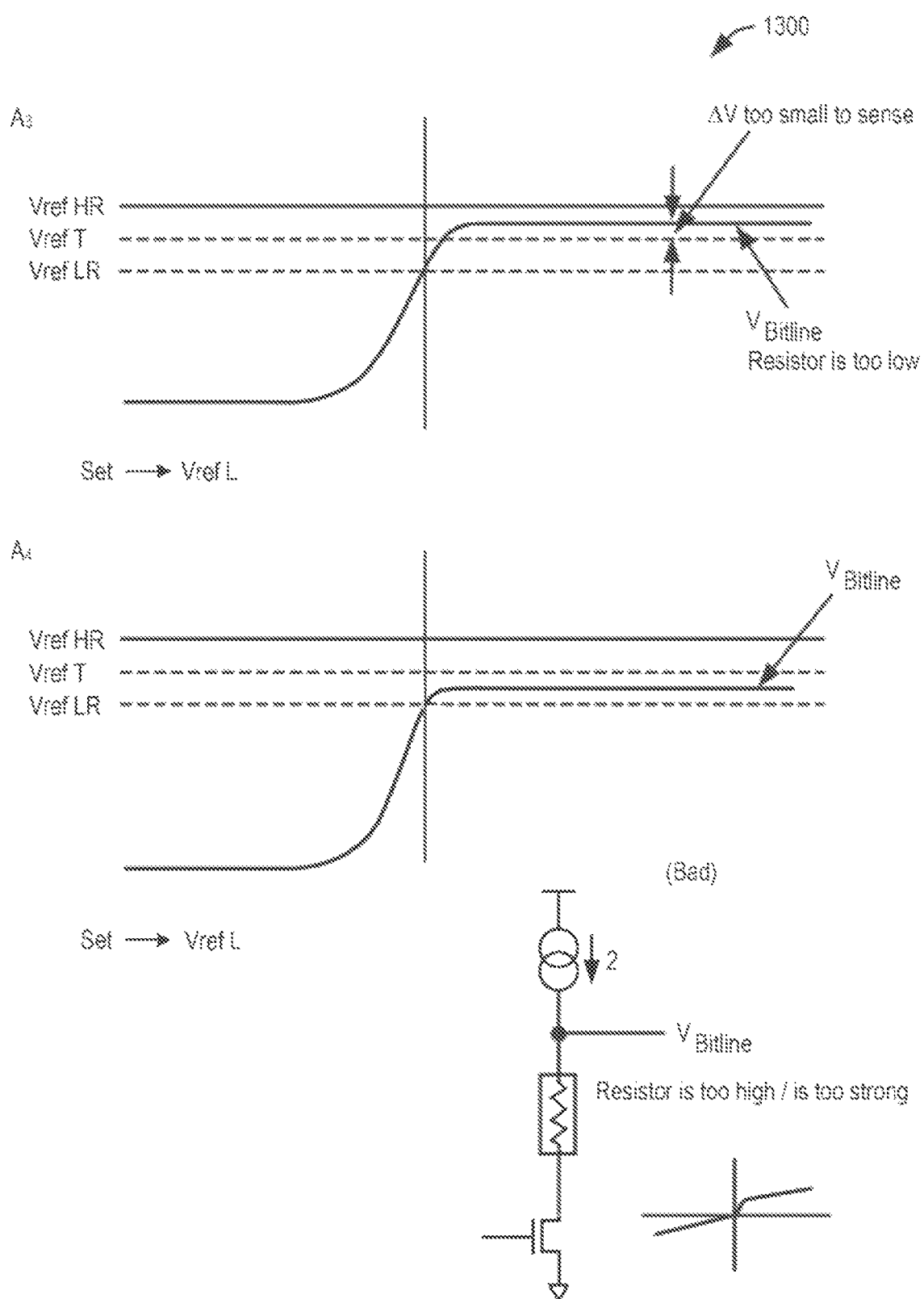
FIG. 13 is a block diagram of a Waveforms for Sense Amplifier for case A3 and A4 according to some embodiments.

FIG. 13 is a block diagram of a Waveforms for Sense Amplifier for case A3 and A4 according to some embodiments. Vbitline is Sense Amplifier Data-Out waveform vs. different three Reference voltages, Vref. HR, Vref, RT and Vref, LR.

In the example of FIG. 13, the sense amplifier bit-line voltage levels are shown versus reference voltage generated from the dynamic reference array.

Wave forms of high resistance cells, fixed Verf. Are shown versus bit-line voltage level. Read "0" and "1".

In case A3, a status register setup is shown for wave-forms of VRH, VRT, and VRL versus bit-line voltage level.

In case A4, a status register setup is shows for wave-forms of VRH, VRT, and VRL versus bit-line voltage level.

FIG. 14 is a block diagram of dynamic programming algorithms according to some embodiments.

In some embodiments, when PCM cells array (e.g., reconfigurable dual-function cell array 102) is in programming mode, the #PCM signal is pulsed. PCM cell program electrical characteristic may be used to determine the #PCM pulse width. Different manufacturers and technologies could use different #PCM pulse width. After programming the PCM cells array, the PCM Dynamic programming algorithms may switch to read mode and output of sense amplifier may compare the programming data pattern. If a match occurs, then YES is set, and program new address. If there is no match, then PGMx applies a new program pulse to program the PCM cells array one more pulse. Then, the system reads/verifies again until a match occurs and/or exceeds a predetermined number of pulses. Stop programming functions. The PCM reference cells array may provide the proper reference voltage.

FIG. 15 is a block diagram of a reconfigurable dual function cell array macro design 1500 according to some embodiments. A function diagram includes multiple paths, and a macro cell selection decoder may be programmed by using fixed PCM cells or a special row of PCM cells to perform the selections of S1, S2, S3, S4, SN connecting different functions. It may use wiring connectives.

FIG. 16 is a block diagram of a reconfigurable dual function cell array macro cell selection circuit according to some embodiments. FIG. 16 is the circuit of the macro cell selection decoder according to some embodiments.

FIG. 17 is a block diagram of custom function block design examples according to some embodiments. Logic Functions may be fixed functions blocks "Adder" or "Multiplier."

The 3D-die stacking reconfigurable processor described above can be used in a variety of different applications. For example, Mobile Internet of Things (IoT) edge devices have two key characteristics, namely, (1) mobility and (2) connectivity (including security). In some embodiments of the present invention, mobile IoT edge devices can use a reconfigurable processor as described above to address mobility. And, mobile IoT edge devices can use a connectivity unit, such as a 5G or WiFi modem, to address connectivity.

Traditional 5G modems (such as those used in mobile phones) have an embedded processor (CPU), 5G Phy-layer, and other components (such as GPU, DSP, display, memory, modem, connectivity, security, multimedia, USB ports, SATA ports, etc.). Although widely adopted, the 5G modem architecture comes with overall system complexity, increased software development tasks, and high system development and manufacturing costs (including licensing fees and die costs). Software development tasks require users to handle multiple different software stacks, including a first stack for the main system processor and a second stack for the 5G modem processor. There is a need to arbitrate between the two processors. For mobile IoT edge devices, embedded systems or mobile wireless robot applications, the standalone 5G modem with embedded processor is overkill, adding unnecessary cost and possibly reducing system performance.

Some embodiments of the present invention provide a mobile IoT edge device that includes a processor-independent 5G modem that includes and interface to cooperate with the processor and the reconfigurable memory of the main processor unit of the mobile IoT edge device. Some possible advantages of using a processor-independent 5G modem includes reduced die cost, reduced software development tasks, and reduced energy consumption. In some embodiments, there is no longer a need to arbitrate between the two processors, and the system can operate using only a single software stack.

Further, using the reconfigurable processor unit described above may provide several other benefits. Silicon design may integrate multiple functions and architectures. System on a Chip (SOC) (e.g., ASIC) design may enable integration of logic (MCU) with embedded memory and analog circuitry (such as PCIx and USBx SerDes Phy). SOC may integrate onboard voltage regulators to provide multiple voltages for different types of on-chip circuits. SerDes Phy and regulators are analog circuitries, which are notoriously unable to scale and thus take a disproportionate amount of silicon area and consume more power than digital circuits. For advanced CMOS process design, it is not cost-effective. Memory-centric design requires non-volatile onboard memory. Current Flash memory is unable to scale below 28 nm. Emerging non-volatile memory is not ready for integration with CMOS technologies below 10 nm. Leveraging heterogeneous 3D integration of the processor, memory and logic layer (FPGA/PLD), which connects the host's I/O ports to the resident data, improves processing-in-memory architecture's memory performance.

Figure 18:
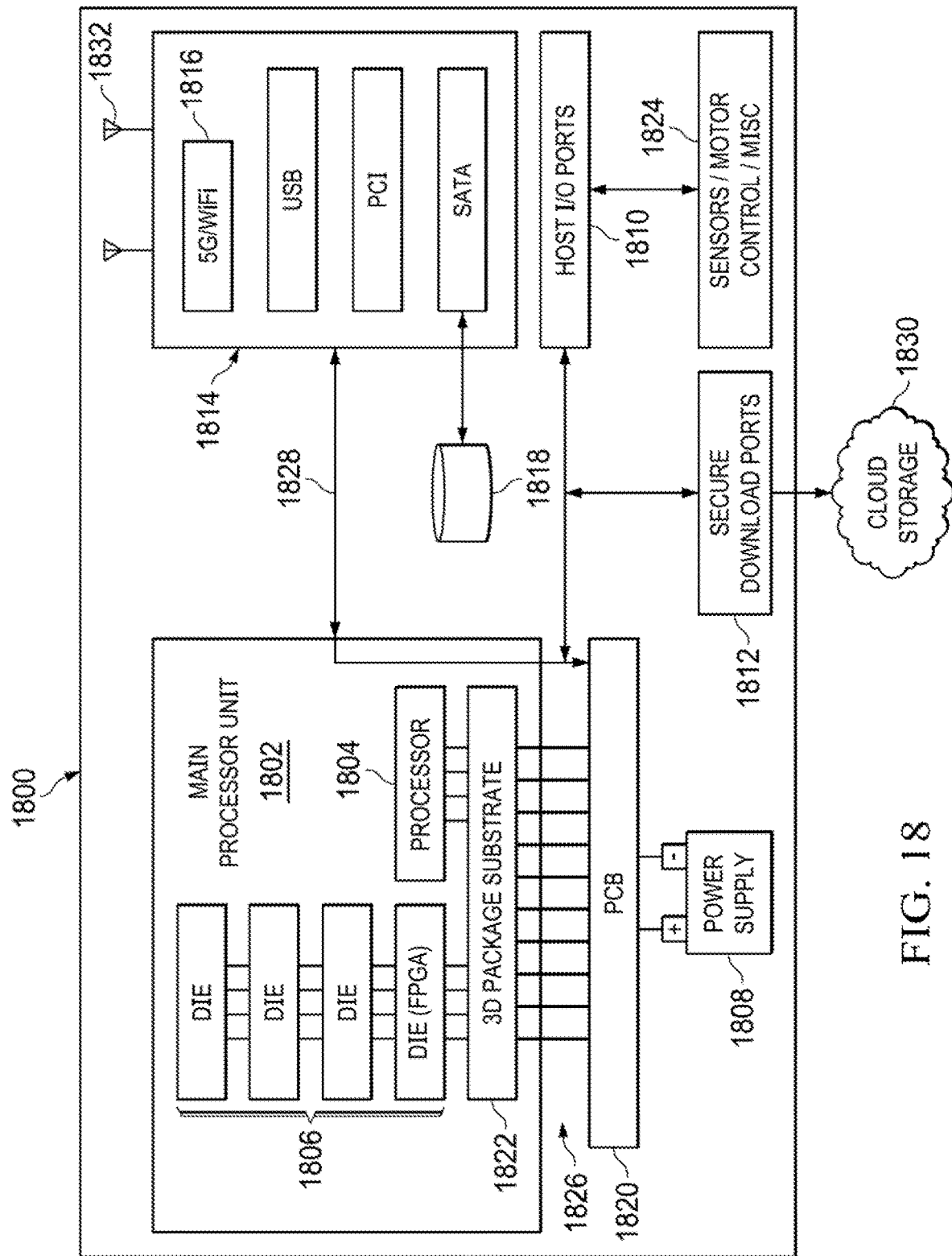
FIG. 18 is a diagram that illustrates a mobile IoT edge device that uses 3D-die stacking reconfigurable processor and a processor-independent modem according to some embodiments.

FIG. 18 is a diagram that illustrates a mobile IoT edge device 1800 that uses 3D-die stacking reconfigurable processor and a processor-independent modem. As shown, the mobile IoT edge device 1800 includes a main processor unit 1802 coupled via connectors 1826 to a printed circuit board (PCB) 1820, a power supply unit 1808 coupled to the PCB 1820, a connectivity unit 1814 coupled via a connectivity port 1828 to the main processor unit 1802, secure download ports 1812 coupled to cloud storage 1830, and sensors/motor/miscellaneous 1824 coupled via host I/O ports 1810 to the main processor unit 1802.

In some embodiments, the main processor unit 1802 includes a processor 1804 coupled to a 3D package substrate 1822 and a die stack 1806 coupled to the 3D package substrate 1822. The die stack 1806 may include a stack of die elements, including elements as described above. Elements of the die stack 1806 may include Field Programmable Gate Array (FPGA) logic, a Programmable Logic Device (PLD) and/or a System on a Chip (SOC). The die stack 1806 may include memory elements, including reconfigurable memory elements that can be used as storage/cache memory or a FPGA configuration memory. Further, the die stack may include analog circuitry for controlling aspects of the connectivity unit 1816 (e.g., Phy-layer circuitry).

In some embodiments, the connectivity unit 1814 includes processor-independent connectivity (e.g., 5G/WiFi) circuitry 1816 coupled to one or more antennas 1832 as well as other components such as USB 3.X, PCIe.X, SATAx and modem storage (SSD) 1818. The connectivity circuitry 1816 may include Phy-layer circuits and other circuits for receiving signals/data over wireless (or wired) channels and for transmitting the signals/data to the main processor unit 1802 for processing. Additional details of the processor independent connectivity circuitry 1816 is shown and discussed with regard to FIG. 20.

In some embodiments, because the connectivity modem 1814 does not include a processor, the processor-independent modem may include connectivity circuitry 1816, which includes a PHY-layer to receive the signals/data via the antennae 1832 and includes system interface logic to access relevant components of the main processor unit 1802. In some embodiments, the Phy-layer 1816 includes analog circuitry with complicated CMOS technology. Integrating the CMOS analog circuits with digital circuits on single silicon requires high complexity. The incompatibility of sharing digital and analog circuits on the same silicon is well known to cause problems, including high yield loss, testing problems, increased product development time, and increased manufacturing costs. Accordingly, in some embodiments, the architecture leverages the 3D-die stacking technology, for example by adding a first die element for the analog circuitry and a second die element for digital circuitry. In such a case, the connectivity circuitry 1816 may include direct connections to the analog circuitry die element.

By connecting the main processor unit 1802 to the connectivity circuitry 1816, the system can implement many of the modem processor functions using FPGA functions of the main processor unit 1802 without requiring the connectivity unit 1814 to have its own embedded processor. Thus, the system can improve performance. In some embodiments, the connectivity unit 1814 may include a standalone 5G modem with an embedded processor. In such a case, some of the connectivity unit 1814 functions can be performed by the embedded processor and some can be performed by the main processor unit 1802.

The system may leverage Through-Silicon Vias (TSVs) to enhance system performance as well as increase wiring capability. 3D die stacking technology is packaged with high pin-count silicone within a small area.

The secure download ports 1812 can download software for system updates and protecting firmware security. The processor 1804 may be programmed by a firmware load from external Flash memory or onboard ROM. The firmware codes may be stored in memory within the main processor unit 1802. Once the processor 1804 is programmed or firmware loaded, in some embodiments, the processor 1804 control the mobile IoT edge device 1800, including the connectivity functions of the connectivity unit 1814. The FPGA, SOC or PLD die element(s) provide logic functions to allow the processor 1804 to communicate with the connectivity circuitry 1816. The processor 1804 configures the internal registers of the connectivity circuitry 1816 to control the DMA, data link layer, and Phy-layers. Any special setup/configuration functions can be facilitated by FPGA, SOC or PLD die elements. Thus, the system (including the connectivity unit 1814) can achieve reconfigurability.

Figure 19:
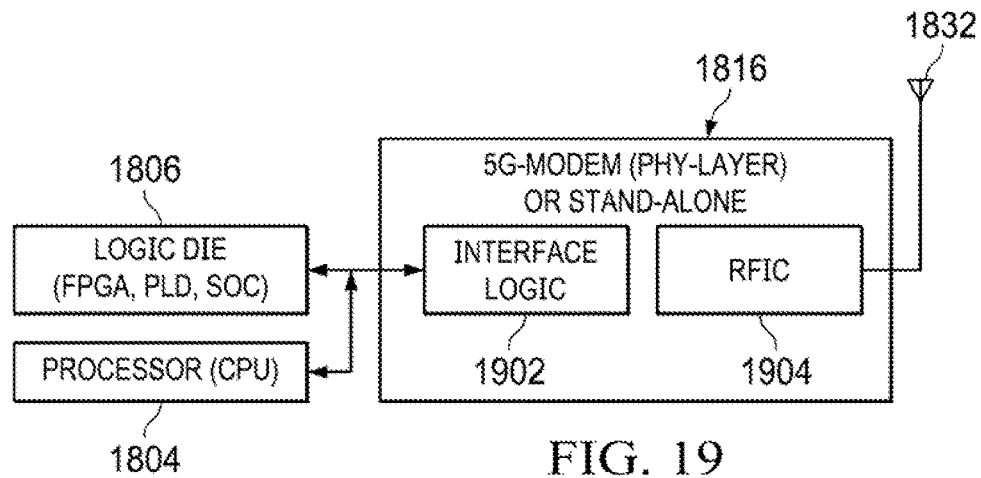
FIG. 19 is a block diagram illustrating details of the connectivity circuitry of the connectivity unit according to some embodiments.

FIG. 19 is a block diagram illustrating details of the connectivity circuitry 1816 of the connectivity unit 1814, in accordance with some embodiments. The connectivity circuitry 1816 includes a Phy-layer to minimize die area and save energy. The connectivity circuitry 1816 further includes system interface logic 1902 to interface with the main processor unit 1802. The Phy-layer includes a radio frequency chip (RFIC) 1904 that communicates with the antenna(s) 1832. The RFIC 1904 is configured to receive incoming signals and transmit outgoing signals over the antenna 1832. The Phy-layer is configured to translate the incoming signals to incoming data and transmit the outgoing data to outgoing signals.

The system interface logic 1902 includes a logic block that communicates incoming and outgoing data with the main processor unit 1802, e.g., with the memory and logic elements 1806 and with the processor 1804. By transferring some of the modem functions to the main processor unit 1802, the system can achieve improved performance, cost and energy consumption can be achieved. In some embodiments, the mobile IoT edge device 1800 uses only a single software stack, which thus reduces product development cycle time.

Figure 20:
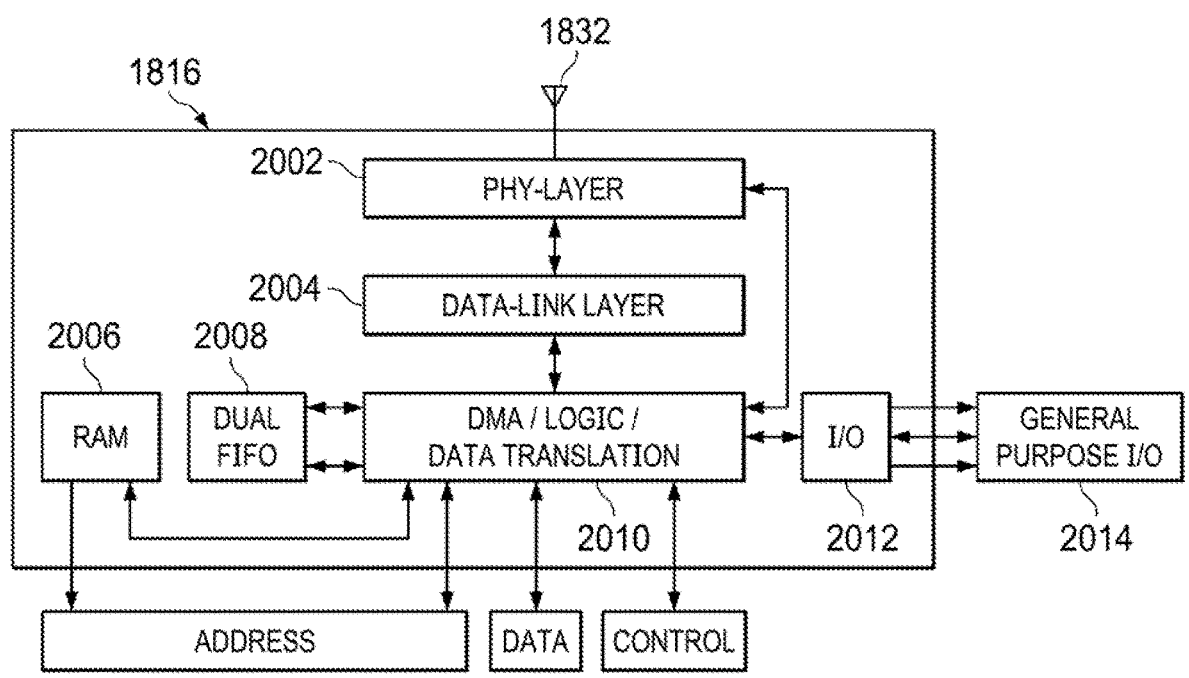
FIG. 20 illustrates a block diagram of a processor-independent connectivity circuitry according to some embodiments.

FIG. 20 illustrates a block diagram of a processor-independent connectivity circuitry 1816. The connectivity circuitry 1816 provides the functions needed for the modem to receive signals/data, which are sent to the main processing unit 1802. By removing unnecessary functions and components from the connectivity unit 1814, system cost and energy consumption can be reduced and system performance can be increased.

The connectivity circuitry 1816 includes a Phy-layer 2002, a data link layer 2004 coupled to the Phy-layer 2002, a Direct Memory Access (DMA)/logic/data translation device 2010 coupled to the data link layer 2004, a dual FIFO 2008 coupled to the DMA/logic/data translation controller 2010, RAM 2006 coupled to the DMA/logic/data translation controller 2010, I/O 2012 coupled to the DMA/logic/data translation controller 2010 and to external general purpose I/O 2014, and other components without an embedded modem processor. Phy-layer 2002 includes the RFIC 1904 in communication with antenna 1832. RAM 2006 and DMA/logic/data translation controller 2010 communicate address, data and control information, which can be received from or forwarded to the main processor unit 1802. The address, data and control information may include configuration information, storage information, control instructions, sensor information, state information, location information, and/or the like.

Figure 21:
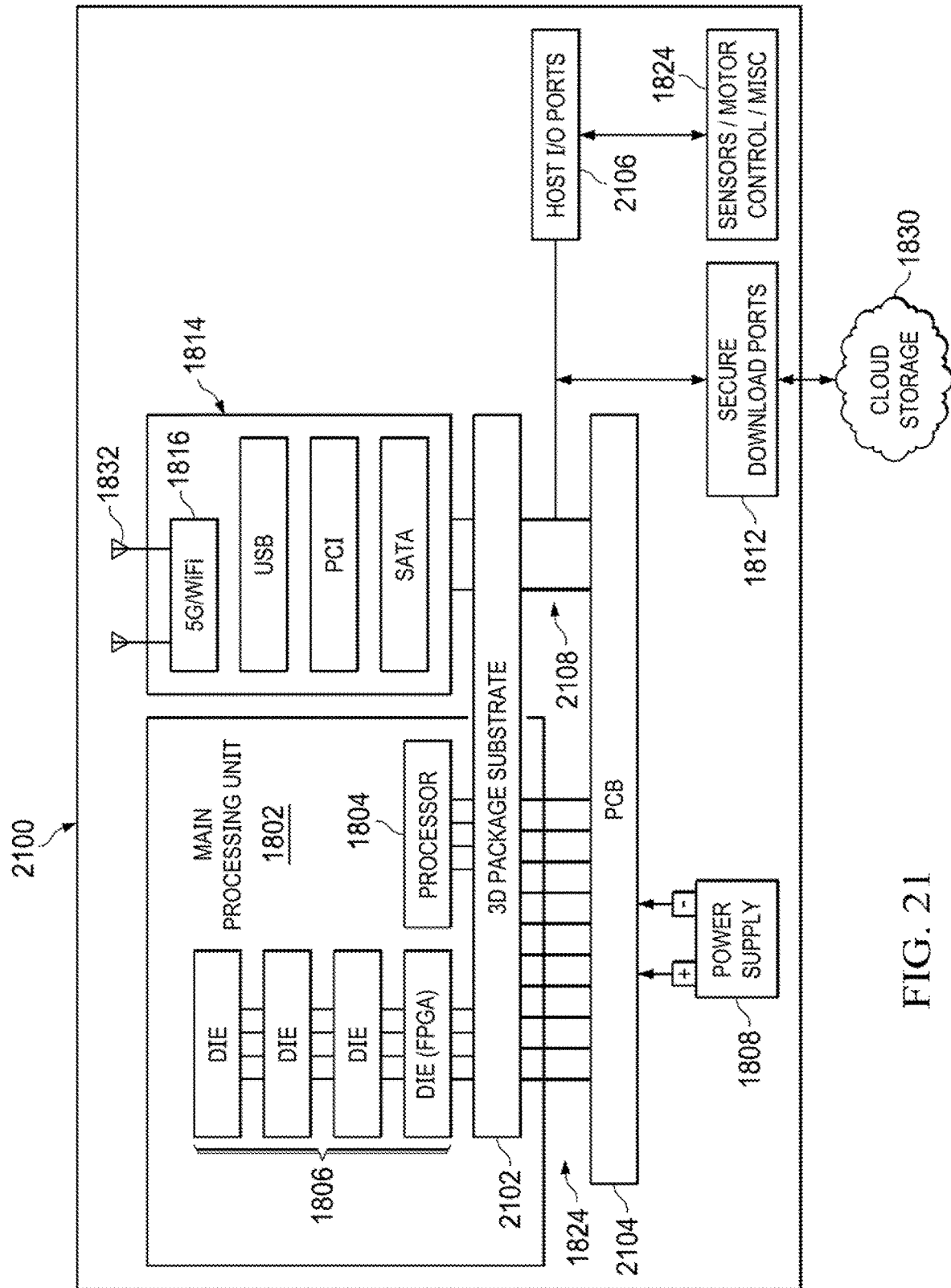
FIG. 21 is a diagram that illustrates a mobile IoT edge device that uses 3D-die stacking reconfigurable processor and a processor-independent modem in a vertically integrated embodiment according to some embodiments.

FIG. 21 is a diagram that illustrates a mobile IoT edge device 2100 that uses 3D-die stacking reconfigurable processor and a processor-independent modem in a vertically integrated embodiment. As shown, the mobile IoT edge device 2100 includes a main processor unit 1802 coupled via connectors 1824 to a printed circuit board (PCB) 2104, a power supply unit 1808 coupled to the PCB 2104, a connectivity unit 1814 coupled via connectors 2108 to the PCB 2104, secure download ports 1812 coupled to cloud storage 1830, and sensors/motor/miscellaneous 1824 coupled via host I/O ports 2106 to the PCB 2104.

In some embodiments, the main processor unit 1802 includes a processor 1804 coupled to a 3D package substrate 2102 and a die stack 1806 coupled to the 3D package substrate 2102. The die stack 1806 may include a stack of die elements, including elements as described above. Elements of the die stack 1806 may include Field Programmable Gate Array (FPGA) logic, a Programmable Logic Device (PLD) and/or a System on a Chip (SOC). The die stack 1806 may include memory elements, including reconfigurable memory elements that can be used as storage/cache memory or a FPGA configuration memory. Further, the die stack may include analog circuitry for controlling aspects of the connectivity unit 1816 (e.g., Phy-layer circuitry).

In some embodiments, the connectivity unit 1814 includes processor-independent connectivity (e.g., 5G/WiFi) circuitry 1816 coupled to one or more antennas 1832 as well as other components such as USB 3.X, PCIe.X and SATAx. The connectivity circuitry 1816 may include Phy-layer circuits and other circuits for receiving signals/data over wireless (or wired) channels and for transmitting the signals/data to the main processor unit 1802 for processing. The connectivity unit 1814 may be coupled to the 3D package substrate 2102, which is coupled to the PCB 2104.

Because the main processing unit 1802 and the connectivity unit 1814 are vertically integrated over the same 3D package substrate 2102 and PCB 2104, additional communication channels are not needed and additional memories may be unnecessary.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. It will further be appreciated that the term "or," as used herein, may be construed in either an inclusive or exclusive sense.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A mobile Internet-of-Things (IoT) edge device, comprising:
   a reconfigurable processor unit including
      a substrate;
      a die stack coupled to the substrate and having a field-programmable gate array (FPGA) die element and a reconfigurable die element, the reconfigurable die element including memory elements and control circuitry, the control circuitry being configured to control the memory elements to serve as storage memory at one time and as configuration memory at another time, the memory elements when serving as configuration memory storing configuration information for controlling the FPGA die element; and
      a processor coupled to the substrate and configured to cooperate with the die stack for processing data; and
   a processor-independent connectivity unit coupled to the reconfigurable processor unit, the processor-independent connectivity unit not including a processor to perform at least a subset of the connectivity unit processing functions, the processor-independent connectivity unit including
      an antenna;
      a radio-frequency chip (RFIC) coupled to the antenna and configured to receive incoming signals and transmit outgoing signals over the antenna; and
      a system interface configured to transmit the incoming signals or data generated therefrom to the reconfigurable processor unit for processing, and configured to receive outgoing signals or data generated therefrom from the reconfigurable processor unit, the FPGA die element being configured based on the configuration information to operate as analog circuitry for processing the incoming signals or data generated therefrom, the analog circuitry being configured to perform at least the subset of the connectivity unit processing functions on behalf of the processor-independent connectivity unit.

2. The mobile IoT edge device of claim 1, wherein the connectivity unit operates on a 5G band.

3. The mobile IoT edge device of claim 1, wherein the connectivity unit operates on WiFi.

4. The mobile IoT edge device of claim 1, wherein the connectivity unit is coupled to the substrate.

5. The mobile IoT edge device of claim 1, wherein the system interface includes a direct memory access (DMA) controller and a first in, first out (FIFO) buffer.

6. The mobile IoT edge device of claim 1, further comprising sensors and motors, wherein the sensors and motors are coupled to the reconfigurable processor unit via host input/output (I/O) ports.

7. The mobile IoT edge device of claim 1, further comprising a power supply configured to power the reconfigurable processor unit.

8. The mobile IoT edge device of claim 1, further comprising secure download ports for receiving firmware or configuration updates.

9. A method performed by a mobile Internet-of-Things (IoT) edge device, comprising:
receiving incoming signals from an antenna by a Phy-layer on a processor-independent connectivity unit, the Phy-layer including a radio-frequency chip (RFIC), the processor-independent connectivity unit not including a processor to perform at least a subset of the connectivity unit processing functions; and
transmitting the incoming signals or data generated therefrom by a system interface of the processor-independent connectivity unit to a reconfigurable processor unit for processing, the reconfigurable processor unit having a substrate, a die stack coupled to the substrate and having a field-programmable gate array (FPGA) die element and a reconfigurable die element, the reconfigurable die element including memory elements and control circuitry, the control circuitry being configured to control the memory elements to serve as storage memory at one time and as configuration memory at another time, the memory elements when serving as configuration memory storing configuration information for controlling the FPGA die element, and a processor coupled to the substrate and configured to cooperate with the die stack for processing the incoming data, the FPGA die element being configured based on the configuration information to operate as analog circuitry for processing the incoming signals or data generated therefrom, the analog circuitry being configured to perform at least the subset of the connectivity unit processing functions on behalf of the processor-independent connectivity unit.

10. The method of claim 9, wherein the connectivity unit operates on 5G.

11. The method of claim 9, wherein the connectivity unit operates on WiFi.

12. The method of claim 9, wherein the connectivity unit is coupled to the substrate.

13. The method of claim 9, wherein the system interface includes a direct memory access (DMA) controller and a first in, first out (FIFO) buffer.

14. The method of claim 9, further comprising using the incoming data to control a motor, wherein the motor is coupled to the reconfigurable processor unit via host input/output (I/O) ports.

15. The method of claim 9, further comprising receiving power from a power supply coupled to the reconfigurable processor unit.

16. The method of claim 9, further comprising receiving firmware or configuration updates via secure download ports.

\* \* \* \* \*